(12) United States Patent
Terry et al.

(10) Patent No.: US 12,417,481 B2
(45) Date of Patent: Sep. 16, 2025

(54) SYSTEMS AND METHODS FOR AUTOMATING CLOTHING TRANSACTION

(71) Applicant: Bodidata, Inc., St. Petersburg, FL (US)

(72) Inventors: J. Bruce Terry, St. Petersburg, FL (US); Kelsey MacDonald, Halifax (CA); Albert Charpentier, Malvern, PA (US); Hoa Vinh Pham, Ho Chi Minh (VN); Tuoc V. Luong, Saratoga, CA (US); Tung Viet Vu, Ho Chi Minh (VN); Long Hai Nguyen, Ho Chi Minh (VN); Quan Hong Hua, Ho Chi Minh (VN); Hai Hoang Nguyen, Ho Chi Minh (VN)

(73) Assignee: Bodidata, Inc., St. Petersburg, FL (US)

( * ) Notice: Subject to any disclaimer, the term of this patent is extended or adjusted under 35 U.S.C. 154(b) by 346 days.

(21) Appl. No.: 17/959,813

(22) Filed: Oct. 4, 2022

(65) Prior Publication Data

US 2023/0104072 A1    Apr. 6, 2023

Related U.S. Application Data

(60) Provisional application No. 63/252,774, filed on Oct. 6, 2021.

(51) Int. Cl.
*G06Q 30/0601* (2023.01)
*G06Q 10/0832* (2023.01)
(Continued)

(52) U.S. Cl.
CPC ..... *G06Q 30/0631* (2013.01); *G06Q 10/0832* (2013.01); *G06Q 30/0621* (2013.01);
(Continued)

(58) Field of Classification Search
CPC ........... G06Q 30/0631; G06Q 10/0832; G06Q 30/0621; G06Q 30/0643; G06T 15/205;
(Continued)

(56) References Cited

U.S. PATENT DOCUMENTS 8,842,906 B2    9/2014  Watson et al.
9,053,616 B2 *  6/2015  Grabiner ................ G16H 40/20
(Continued)

OTHER PUBLICATIONS

Siegmund, D., Samartzidis, T., Damer, N., Nouak, A., & Busch, C. (2014). Virtual Fitting Pipeline: Body Dimension Recognition, Cloth Modeling, and On-Body Simulation. VRIPHYS, 14, 99-107. (Year: 2014).*

(Continued)

*Primary Examiner* — Victoria E. Frunzi
*Assistant Examiner* — Jillian K Foltz
(74) *Attorney, Agent, or Firm* — Fox Rothschild LLP; Carol E. Thorstad-Forsyth

(57) ABSTRACT

Systems and methods for automating clothing transactions. The methods comprise: obtaining user input data and/or sensor data specifying characteristics of a body for an individual; transforming the user input data and/or sensor data into a 3D graphical representation of the body; analyzing the 3D graphical representation to derive 3D body measurements for the individual; identifying clothing items based on results from comparing the 3D body measurements to reference measurements associated with clothing items having different styles, sizes and brand associations; analyzing how a fabric elasticity and a garment construction could impact a fit of each identified clothing item relative to each body part of the individual based on the 3D graphical representation of the body; and filtering the clothing items based on results of the analyzing and fit preferences of the individual to generate recommended clothing items for the individual.

38 Claims, 14 Drawing Sheets

(51) Int. Cl.
*G06T 15/20* (2011.01)
*G06T 19/20* (2011.01)

(52) U.S. Cl.
CPC ....... *G06Q 30/0643* (2013.01); *G06T 15/205* (2013.01); *G06T 19/20* (2013.01); *G06T 2200/24* (2013.01); *G06T 2210/16* (2013.01); *G06T 2215/16* (2013.01); *G06T 2219/2021* (2013.01)

(58) Field of Classification Search
CPC . G06T 19/20; G06T 2200/24; G06T 2210/16; G06T 2215/16; G06T 2219/2021
USPC ......................................................... 705/26.7
See application file for complete search history.

(56) References Cited

U.S. PATENT DOCUMENTS

| | | | | |
|---|---|---|---|---|
| 9,341,464 | B2* | 5/2016 | Kimmel | A61F 2/5046 |
| 9,575,172 | B2 | 2/2017 | Charpentier et al. | |
| 11,287,521 | B2 | 3/2022 | Charpentier et al. | |
| 2010/0111370 | A1* | 5/2010 | Black | G06F 18/2321 |
| | | | | 705/26.1 |
| 2011/0298897 | A1 | 12/2011 | Sareen et al. | |
| 2014/0277663 | A1 | 9/2014 | Gupta et al. | |
| 2015/0154691 | A1* | 6/2015 | Curry | G06Q 30/0631 |
| | | | | 705/27.2 |
| 2016/0081435 | A1* | 3/2016 | Marks | A43D 1/02 |
| | | | | 382/154 |
| 2016/0093085 | A1* | 3/2016 | Ray | G06T 5/70 |
| | | | | 345/419 |
| 2019/0295319 | A1 | 9/2019 | Pham et al. | |
| 2019/0311488 | A1* | 10/2019 | Sareen | G06T 7/60 |
| 2020/0320550 | A1 | 10/2020 | Reichert et al. | |
| 2021/0049811 | A1* | 2/2021 | Fedyukov | G06T 7/60 |
| 2021/0065286 | A1* | 3/2021 | Woo | G06V 40/28 |
| 2021/0125405 | A1* | 4/2021 | Tran | G06T 19/006 |
| 2021/0250482 | A1* | 8/2021 | Schieltz | H04N 23/51 |
| 2021/0252715 | A1 | 8/2021 | Javidan et al. | |
| 2022/0207539 | A1* | 6/2022 | Laundy | G06T 7/33 |
| 2022/0253923 | A1* | 8/2022 | Donnelly | G06Q 30/0643 |

OTHER PUBLICATIONS

International Search Report and Written Opinion for International PCT Patent Application No. PCT/US22/45668 mailed Feb. 8, 2023 (14 pages).

* cited by examiner

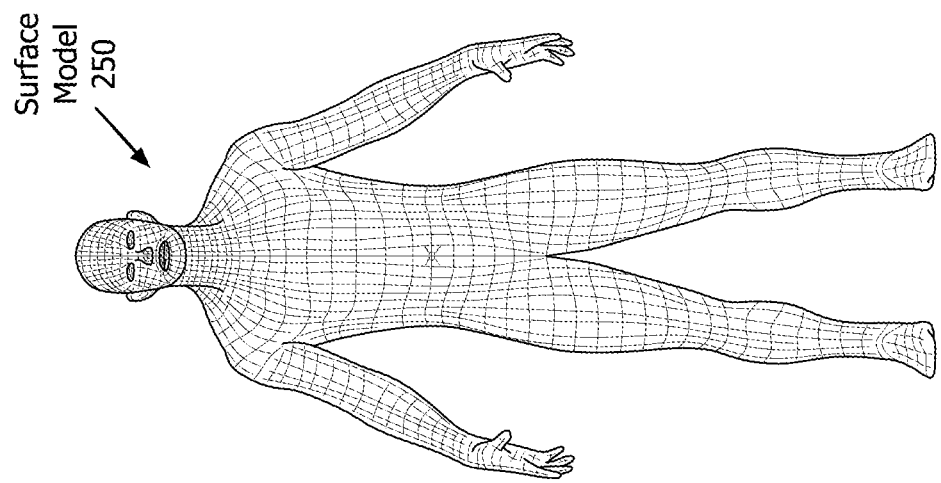
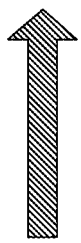
FIG. 2

SYSTEMS AND METHODS FOR AUTOMATING CLOTHING TRANSACTION

CROSS-REFERENCE TO RELATED APPLICATIONS

The present application claims priority to and the benefit of U.S. Patent Ser. No. 63/252,774 which was filed on Oct. 6, 2021. The contents of this application are incorporated herein by reference in its entirety.

BACKGROUND

Statement of the Technical Field

The present disclosure relates generally to computing systems. More particularly, the present disclosure relates to implementing systems and methods for automating clothing transactions.

Description of the Related Art

Cloud computing is being used to provide various services to clients of online service providers. The services include data storage services, data management services and data processing services.

SUMMARY

The present document generally concerns systems and methods for automating clothing transactions. The methods comprise performing the following operations by a computing device: obtaining sensor data or other data specifying characteristics of a body for an individual that was generated using a camera, a radar system, a LiDAR system, an optical sensing system and/or user inputs; transforming the sensor data into a 3D graphical representation of the body; analyzing the 3D graphical representation to derive 3D body measurements for the individual; identifying optimal clothing sizes for Ready-To-Wear (RTW) clothing items based on results from comparing the body measurements to reference measurements associated with a plurality of RTW clothing items having different styles, sizes and brand associations; analyzing how a fabric elasticity and a garment construction could impact a fit of each identified clothing item relative to each of a plurality of body parts of the individual based on the 3D graphical representation of the body; filtering the clothing items based on results of the analyzing and fit preferences of the individual to generate recommended sizes of clothing items for the individual; providing descriptions and ranking how the recommended sizes for the plurality of clothing items will fit specific parts of each individual's body; receiving a user selection of recommended clothing item(s); and/or causing a robotic system to modify a characteristic of the recommended clothing item(s) or deliver the recommended clothing item(s) to the individual. The robotic system can include, but is not limited, to an autonomous robotic system.

In some scenarios, the filtering comprises disqualifying at least one of the clothing items which was identified from being a recommended clothing item when the fit preferences of the individual would not be met if the at least one clothing item is worn by the individual. The method may additionally or alternatively comprise performing operations by the computing device to determine whether any of the recommended clothing items could be altered to improve a fit on the body of the individual.

In those or other scenarios, the methods may also comprise: using the body measurements to generate an avatar for a person in a virtual computing environment; obtaining a virtual 3D clothing item for one of the clothing items which was identified based on results from comparing the body measurements to reference measurements; applying the virtual 3D clothing item to the avatar; evaluating how the virtual 3D clothing item fits a body of the avatar; adjusting a size of the virtual 3D clothing item; re-evaluating how the virtual 3D clothing item fits the body of the avatar; and/or determining whether one or more of the virtual 3D clothing items could be altered to improve a fit on the body of the avatar.

In those or other scenarios, the methods may further comprise: generating a fit score for each of the recommended clothing items; ranking the recommended clothing items based on the fit scores; causing information associated with the recommended clothing items to be displayed on another computing device within a graphical user interface of a software application or within a web page of an ecommerce site; receiving a user input requesting alteration of a clothing item; autonomously causing automated tailoring equipment to obtain and alter the clothing item; and/or causing an autonomous vehicle to obtain and deliver the clothing item (which has or has not been altered) to the individual.

In those or other scenarios, the methods may comprise: identifying at least one person of a plurality of persons for whom a ready-to-wear product would not fit in any available size based on at least one person's body measurement information and reference measurement information associated with the ready-to-wear product; generating a recommendation for an additional size for the ready-to-wear product based on the body measurement information for at least one person of the plurality of persons; and/or providing the recommendation for the additional size to a business entity providing the ready-to-wear product.

In those or other scenarios, the methods may comprise: comparing a clothing specification for a clothing item to body measurements for a plurality of anonymized individuals to determine recommended changes to the clothing specification for improving a fit of the clothing item; and/or providing the recommendation changes to the clothing specification to a business entity associated with the clothing item.

The implementing systems can comprise: a processor; and a non-transitory computer-readable storage medium comprising programming instructions that are configured to cause the processor to implement a method for operating a computing system. The above-described methods can also be implemented by a computer program product comprising memory and programming instructions that are configured to cause a processor to perform operations.

BRIEF DESCRIPTION OF THE DRAWINGS

The present solution will be described with reference to the following drawing figures, in which like numerals represent like items throughout the figures.

FIG. 2 provides an illustration of a 3D point cloud and a surface model for an individual.

DETAILED DESCRIPTION

Figure 1:
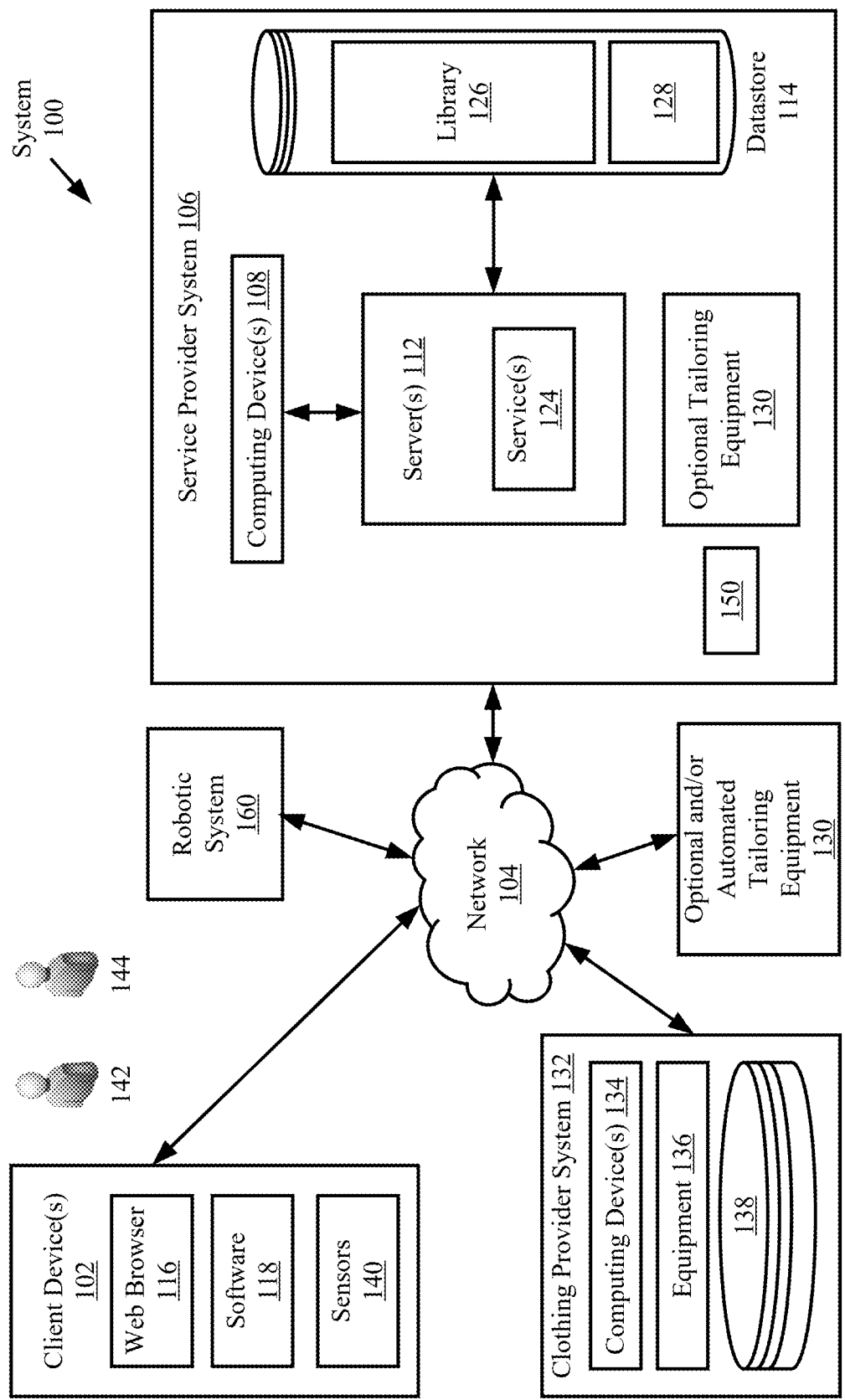
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skills in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such as "first" and "second" are used to modify a noun, such use is simply intended to distinguish one item from another and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The present document concerns systems and methods for providing cloud or online services for automating clothing transactions and/or minimizing clothing returns. The present solution provides a unique group of cloud or online services that do not replicate processes that could be achieved on a manual basis. The cloud or online services include a body measurement service, a size-matching service to determine an optimal size for a plurality of styles and a plurality of individual body shapes and measurements, a client management service, a product improvement service, a custom tailoring/fabrication service, and a virtual fit safari service. Each of the listed cloud or online services will be described in detail below. The listed cloud or online services generally facilitate comparisons of on-demand measurements of an individual to a database of clothing specifications for recommending the best size of RTW clothing for the individual.

Each style of RTW clothing is designed based on a specific body (that can be a mannequin or an actual person) or based on a virtual statistical grading (e.g., an average male between 25-45 have dimensions x, y and z). The RTW clothing can include, but is not limited to, Commercial-Off-The-Shelf (COTS) clothing. RTW clothing can be purchased from clothing stores and/or ecommerce websites. The mannequin and actual person are referred to herein as a fit model. A fit model's shape and dimensions are unique. A pattern is developed for a clothing item that will fit the fit model in the manner intended by a clothing designer. Clothing specifications are generated based on the pattern. Different items of clothing are designed for the fit model. Each such clothing item is unique in terms of how it will rest on the fit model body and how the fabric will drape, hang, manifest and react to movement of the fit model. Thus, each such clothing item is considered a unique style. Each unique style has a pattern represented by a large number of measurements that determine a 3D graphical representation of the clothing item. The clothing specification include these measurements. During manufacturing, fabric is cut to match the clothing specifications and assembled into the clothing item. A base size for each unique style is derived from the fit model and assigned to the clothing item. Larger and smaller sizes are derived from the base size creating a "grading scale" for the unique style. The grading scale relates to how the measurements of various dimensions of the pattern increase as the overall clothing item size increases and how measurements of the pattern decrease as the overall clothing size decreases. People's body dimensions do not increase in a linear fashion no matter what the underlying shape of the individual is.

The fit model's size is unique and provides an approximate representation of the body shape for a given percentage of the population. Depending on the style and the design, a base style might be a good match for twenty percent of people whose measurements and proportions approximate the fit model. The quality of the fit of graded sizes on people with similar body shapes to the fit model will vary based on the assumptions used when developing the grading scale.

The same clothing company may use different fit models with different body shapes to create styles that represent a broader range of body shapes. The more styles that are created, for more body shapes, the better the likelihood of a reasonably good fit for people of different body shapes at various sizes on the grading scale. There is no consistency in fit models used for different styles and/or clothing companies. There is no consistency in the base size attributed by different designers to fit models of similar proportions.

Consumers do not have an efficient and reasonable solution to quickly understand how all of the different styles and grading scales of the same or different companies will fit their unique body shape and dimensions relative to their own unique preference for the looseness, tightness and appearance of the fit. The present solution provides an at least partially automated means for assisting consumers and/or other individuals with efficiently and quickly understanding and identifying brands, styles and/or clothing items that provide the best fit in accordance with their clothing appearance preferences. The present solution provides improvements to online shopping platforms since the underlying computing system can make clothing recommendations automatedly and/or without requiring customers to go to physical stores for body measurements, can more quickly identify relevant search results for clothing items, and present the same (i.e., the clothing recommendations and/or search results) to users of the online shopping platform which results in improved customer satisfaction. The improved search results/clothing recommendation feature of the present solution also results in improved resource intensivity of the online shipping platforms since the total number of searches for clothing items of interest is reduced as compared to conventional systems.

The present solution provides a cost-effective, automated system for determining the optimal size for a particular style based on the unique body shape and measurements of each individual. Since the clothing items are RTW clothing items and not custom fit clothing items, in many instances, the optimal size for a particular style will require alterations to meet the personal preferences of the individual. The present solution determines how the optimal size of a style will fit a given individual at a granular body part-by-body part level. This granular information is then provided to the user so that (s)he can determine if (s)he will be satisfied with the quality of the overall fit of the clothing item before making an online purchase of the same without trying on the clothing item. This information allows the user to focus on styles from a relatively large number of clothing companies/brands that provide the best fits for his(her) unique body shape and/or that provide the best match to his(her) personal fit preferences, without the need to visit physical retail store(s) to try on the clothing items, without the need to try on the clothing items when visiting a physical store, and/or without the need for assistance from retail store employees.

Illustrative Systems

Referring now to FIG. 1, there is provided an illustration of a system 100 implementing the present solution. System 100 is configured to provide a unique group of services 124 to users 142, 144 for facilitating transactions concerning clothing selection, purchase, alteration and/or fabrication. The services include a body measurement service, a size-matching service, a client management service, a custom tailoring/fabrication service, a product improvement service, and/or a virtual fit safari service. Each of the listed services will be described in detail below.

System 100 may employ blockchain technology to store transaction information in an immutable ledger. For example, a block is added to the blockchain when a clothing item is purchased or returned by an individual, a clothing item is altered or fabricated by tailoring equipment 130, and/or a clothing item is shipped or otherwise provided to an individual (for example, in-person or using an autonomous vehicle).

System 100 comprises client device(s) 102 which are used by one or more customers of a service provider and/or other individual(s) including the individual customer benefit from the service. The client device(s) 102 is(are) configured to facilitate the creation of a 3D graphical representation of the user(s) 142 by generating sensor data and/or obtaining other information. This feature of the present solution is provided as a body measurement service. The client device(s) 102 can include, but is(are) not limited to, mobile phones, smart phones, tablets, personal computers, handheld scanning devices and/or other devices. One or more sensors are provided with the client device(s) 102. The sensor(s) include, but is(are) not limited to, camera(s), radar system(s), LiDAR system(s), optical sensing system(s), and/or proximity sensor(s). The handheld scanning device(s) can include, but is(are) not limited to, the handheld scanning device described in U.S. Pat. No. 11,287,521 entitled "Systems and Methods for Improved Radar Scanning Coverage and Efficiency" ("the '521 Patent") and/or the handheld scanning device described in U.S. Pat. No. 9,575,172 entitled "Handheld Multi-Sensor System for Sizing Irregular Objects" ("the '172 Patent"). The entire contents of the '521 Patent and the '172 Patent are incorporated herein by reference.

Body Measurement Service

The client device(s) 102 implement(s) a plurality of different body measurement techniques. The body measurement techniques are selectable manually by user(s) 142, 144 of the client device(s) 102 and/or autonomously by the client device(s) 102 based on detected conditions of the individual and/or surrounding environment. The manual selection can be achieved using physical and/or virtual widgets of the client device(s) 102. The physical widgets can include, but are not limited to, depressible buttons and/or keys of a keypad. The virtual widgets can include, but are not limited to, virtual buttons of a touch screen display and/or a drop-down menu with selectable items.

The autonomous selection can be achieved, for example, using sensor data generated by one or more sensors of the client device(s) 102. The sensor(s) can include, but are not limited to, location sensor(s) (for example GPS sensor), altitude sensor(s), humidity sensor(s), light sensor(s), temperature sensor(s), moisture sensor(s), heat sensor(s), and/or odor sensor(s). A look-up table (LUT) may be stored in datastore 114 which specifies conditions when each body measurement technique should be or should not be employed. For example, changes in temperature or poor lighting may influence measurements made by radar systems and/or lidar systems. Thus, a camera-based body measurement technique may be desirable in scenarios where the operating temperature of the internal components and/or external surfaces of the client device(s) 102 fall(s) outside threshold range(s) of temperatures for proper operations of the radar and/or lidar systems. In contrast, radar and/or lidar based body measurement technique(s) may be desirable (as opposed to the camera-based body measurement technique) in scenarios where the humidity of a surrounding environment exceeds a threshold humidity and/or the amount of ambient light falls below a threshold level. The present solution is not limited to the particulars of this example.

Each of the body measurement techniques can be used at any given time to facilitate creation of a unique user profile for an individual and a related 3D graphical representation of the individual's body. The unique user profile can include, but is not limited to, a unique identifier for an individual, a customer number, contact information for the individual, subscription information for cloud-based service(s), privacy settings, an age for the individual, a gender for the individual, a body profile, clothing appearance preferences, and/or clothing fit preferences. The body profile can include, but is not limited to, information defining a body type, a body shape and/or a body posture. The body type can include, but is not limited to, an hourglass body type, an apple body type, a triangular or pear body type, a ruler body type and/or an inverted triangular body type. The body shape can be defined by measurement data acquired using sensor(s) of the client device(s) 102 and/or input into the client device(s) 102 by the user. The body posture can include, but is not limited to, a healthy posture, a kyphosis posture, a flat back posture, and/or a swayback posture. The clothing appearance preferences can include, but are not limited to, colors, patterns (for example, plaid and/or striped), decorative design details, styles (for example, A-line skirts and/or pleated skirts), brands, fabrics (for example, cotton, denim, lace, linen and/or leather), fastener types (for example, buttons, zippers, hook and loops, etc.), and/or length (for example, knee length, calf length, short sleeves, long sleeves, etc.). The clothing fit preferences can include, but are not limited to, loose, tight, extra slim, slim, athletic, straight, classic fit, seaming and/or darting. The 3D graphical representation of the individual's body can include, but is not limited to, a surface model 250 such as that shown in FIG. 2.

For example, a first body measurement technique is used at a first time to create a body profile, while a second different body measurement technique is used at a second subsequent time to update the body profile. The first body measurement technique can include a scanner-measurement-based technique, while the second different body measurement technique includes a self-measurement-based technique. The body profile may be updated by the computing system when certain criteria is met. For example, the system performs operations to update the body profile when the person's weight changes by a threshold amount (for example, increases or decreases by 10 or more pounds) and/or an operation is performed to change the person's posture or other physical feature. The present solution is not limited to the particulars of these examples.

Two or more of the body measurement techniques can be combined to facilitate the creation of the unique profile and related 3D graphical representation of the individual's body. In this case, measurements obtained via two or more body measurement techniques may be combined to produce final body measurements. For example, radar depth values can be combined with LiDAR data sets to generate a 3D point cloud, which can be used to create a 3D model of the individual's body or used to select a 3D model from a plurality of pre-defined 3D models for human bodies to which the 3D point cloud best fits or matches. Additionally or alternatively, 3D data points for one or more given body parts (for example, an upper arm circumference) may be modified in accordance with values input into the system during a self-measurement-based process or other type of measurement process. The measurements obtained via different measurement techniques can be averaged, weighted or otherwise combined. The weights associated with each set of measurements may be pre-defined and stored in a datastore (such as datastore 114). In some cases, the measurement values obtained during a scanner-based measurement process is weighted greater than the measurement values obtained during a self-measurement-based process since scanner measurements are generally considered more accurate than self-measurements. The present solution is not limited to the particulars of this example.

Measurements can be derived from the unique profile and/or 3D graphical representation on demand using software algorithms. Measurements are calculated on demand and may or may not be maintained in a datastore 114. All body measurement techniques work against the same matching engine.

In some scenarios, every instance of usage requires a novel creation of measurements. In that sense, the client device(s) 102 is(are) body representation creation system(s). Each body representation is catalogued in datastore 114 and accessed using a unique identifier called a Bodi-ID. This on demand creation could not, as a practical matter, be done manually and the number of measurements that can be created from the unique profile is essentially unlimited which is beyond normal manual capability. When created, the measurements are used for a variety of purposes as described below.

If the client device 102 is a handheld scanning device, then an operator 142 uses the same to acquire sensor data useful in creating an accurate 3D graphical representation of an unclothed body from a fully clothed individual 144. The handheld scanning device can be the same as or similar to that described in the '521 Patent and/or the '172 Patent. The handheld scanning device can employ a camera, a radar system, and/or an optical sensing system. Additionally or alternatively, the handheld scanning device can employ a LiDAR system. Thus, the sensor data generated by the handheld scanner may include images, videos, radar data, LiDAR data, and optical data. The sensor data may be processed by the client device 102 (e.g., using proprietary software) or another device (e.g., an auxiliary device of the client device or another standalone device) to create the accurate 3D graphical representation of an unclothed body. Additionally or alternatively, the sensor data is communicated from the handheld scanning device to the service provider system 106 via network 104 for processing thereat to create the accurate 3D graphical representation of an unclothed body. Network 104 can include, but is not limited to, the Internet and/or cellular network.

If the client device 102 is a device other than the handheld scanning device (such as a smart phone), then the unique profile/3D graphical representation creation is assisted by a proprietary application and/or web application (individually and/or collectively referred to as the "app") installed/running/executing on the client device. The app is configured to perform photo transformation, LiDAR video transformation, and/or manually assisted transformation. In the handheld scanner, 3D video LiDAR and 2-photo applications, each of the transformations involves transforming 2D/3D sensor data to a 3D body shape model for the individual 144. The 2-photos include a front photo and a side photo. A 3D representation may additionally or alternatively be extracted from a single image (e.g., a photo or video).

The photo transformation can include, but is not limited to, the process described in U.S. Pat. No. 8,842,906 ("the '906 Patent), which is incorporated herein by reference in its entirety. The photo transformation generally involves capturing a first image of the individual 144 from a front perspective view and a second image of the individual 144 from a side perspective view. The individual 144 is in clothing (for example, form fitting clothing) when the first and second images are captured. The clothing can include clothing that tightly fits the individual's body such that the clothing accurately mirrors the contours of the individual's body or bare skin. The app then causes the first and second images to be uploaded to the service provider system 106. At the service provider system 106, server(s) 112 perform(s) operations to store the image in datastore 114 and/or perform operations to create a 3D graphical representation of the individual's body based on the first and second images. Body measurements can be extracted on demand from the 3D graphical representation.

The video transformation generally involves using a camera device and/or a LiDAR system (or such equivalent that may be created in the future) of the client device 102 to record a depth and/or color video of the individual 144. The video is uploaded to the service provider system 106. At the service provider system 106, server(s) 112 perform(s) operations to store the depth map from LiDAR and/or color videos in datastore 114 and/or perform operations to create a 3D graphical representation of the individual's body based on the video. The depth map is defined as a 2D image with pixel values being the distance from the camera to the scene. A camera's intrinsic parameters are used to convert depth map to 3D point cloud comprising a plurality of data points. The 3D graphical representation of the individual's body may comprise the 3D point cloud or can comprise a 3D surface model generated/selected based on the 3D point cloud. Body measurements can be extracted on demand from the 3D graphical representation.

The manually assisted transformation involves performing operations by the client device 102 to guide a user 144 to take a small number of self-measurements using the app. The app causes the measurements to be uploaded to the service provider system 106. At the service provider system 106, server(s) 112 perform(s) operations to store the body measurement data in datastore 114 and/or perform operations to predict additional body measurements using machine learning algorithms and/or a library 126 of body measurements. The actual and predicted body measurements are used by the server(s) to create a 3D graphical representation of the individual's body. Extra body measurements, besides those self-measurements, can be extracted and/or predicted on demand from the 3D graphical representation. The body measurement data comprises body measurement values for various parts of a person's body.

An illustrative 3D point cloud 200 is provided in FIG. 2. The 3D point cloud 200 can be generated using LiDAR data, optical data, radar data and/or camera data (for example, image(s) or video(s)). The 3D point cloud 200 is then processed to obtain a surface model 250 in accordance with any known or to be known technique. One such technique is discussed in the '521 Patent. The 3D graphical representation of the individual's body comprises the surface model 250.

Size-Matching Service

Once the 3D graphical representation(s) (for example, surface model(s) 250 of FIG. 2) has(have) been created, the server(s) 112 use(s) the same to match clothing to the individual's body via the size-matching service. The size-matching service utilizes detailed technical specifications 128 related to the pattern, fabric and construction characteristics of each style. The technical specifications are not available or made accessible to the public. So, the size-matching service does not replicate work that could be otherwise done using conventional solutions. The information is stored in datastore 114. The technical specification 128 of a pattern comprises a 2D and/or 3D description of the style in the form of multiple 2D and/or 3D measurements. The technical specification 128 may also specify fabric(s) and characteristics of the same.

Figure 3:
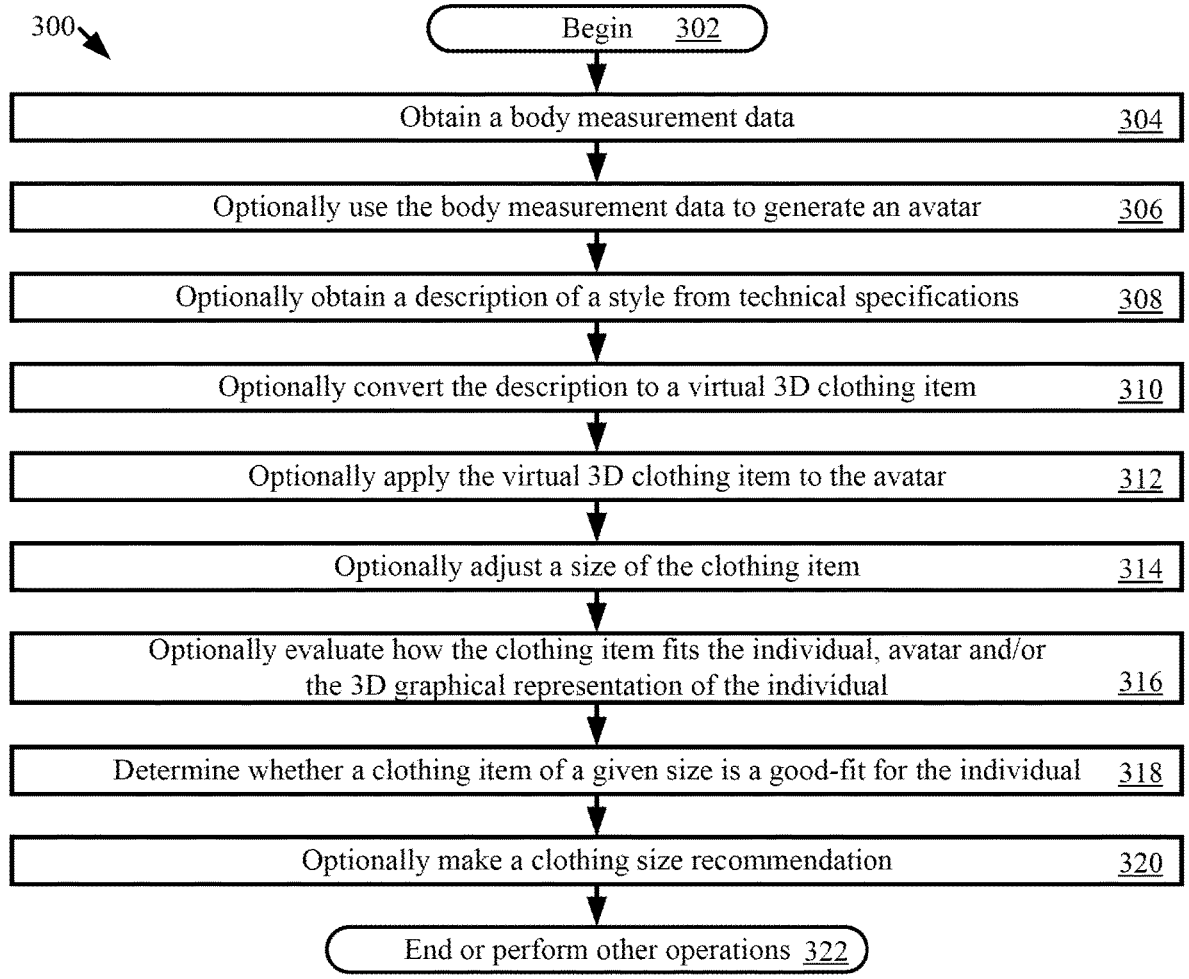
FIG. 3 provides a flow diagram of an illustrative method for providing a size-matching service.

A flow diagram is provided in FIG. 3 for a method 300 for providing a size-matching service. Method 300 is performed at least partially by the server(s) 112 of FIG. 1 and/or the client device(s) 102 of FIG. 1. Method 300 begins with 302 and continues with 304 where the server(s) 112 perform(s) operations to obtain body measurement data generated by the body measurement service. The body measurement data can include, but is not limited to, body measurement values for various parts of a person's body.

Figure 4:
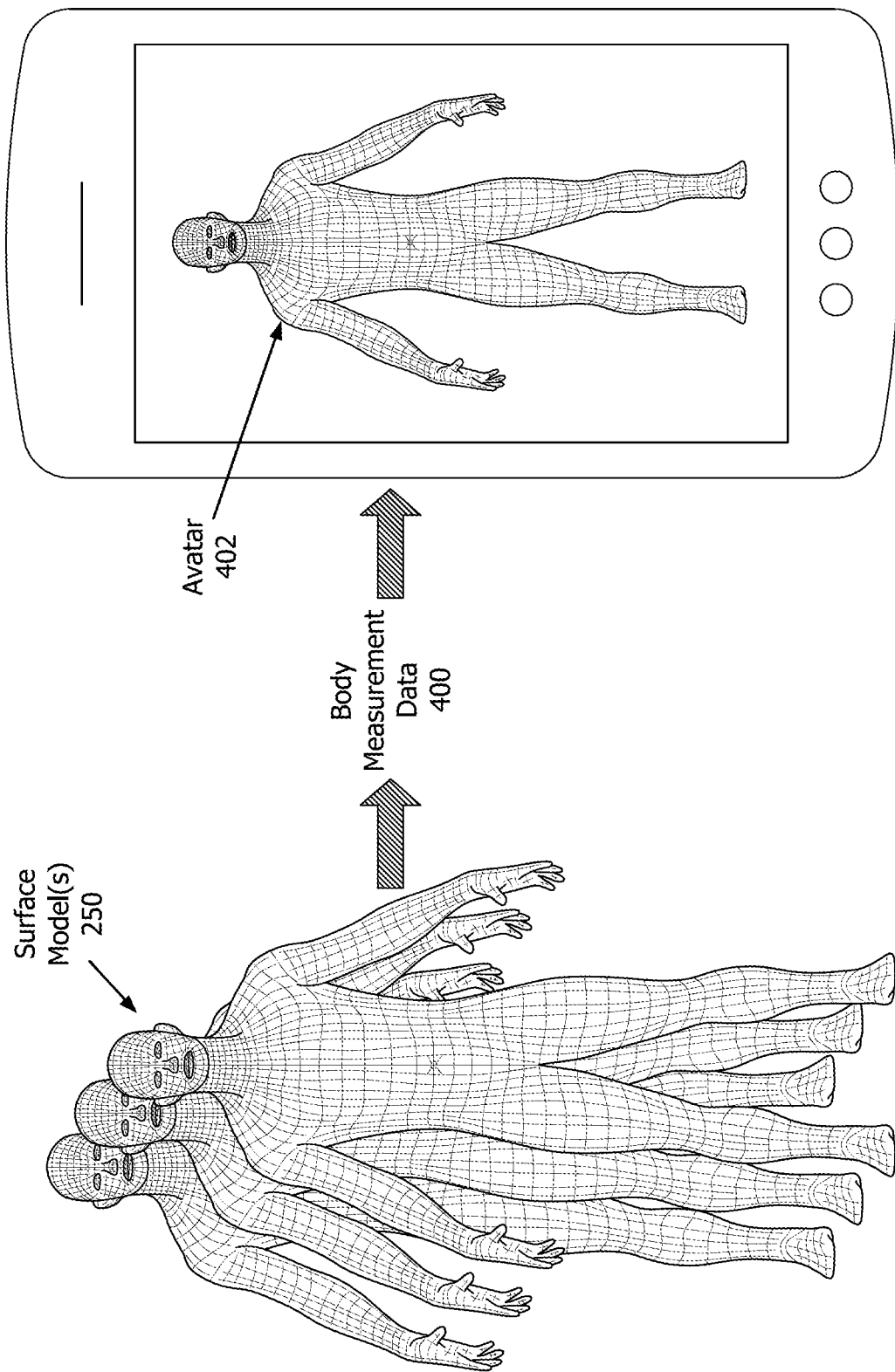
FIG. 4 provides an illustration showing a process for generating an avatar using body measurement data obtained from a surface model for an individual.

Next in 306, the server(s) 112 optionally use(s) the body measurement data to generate an avatar of a person in a virtual computing environment. The person has a body matching that of the individual 144 of FIG. 1. The term "matching" as used here means to match exactly or by a threshold amount (for example, ≥50%, 55%, 60%, 65%, 70%, 75%, 85%, 85%, 95% or 95%). An illustration showing an avatar 402 generated using body measurement data 400 is provided in FIG. 4. Any known or to be known technique for creating an avatar can be used herein. The avatar 302 may be presented on the server(s) 112 and/or the client device(s) 102. The avatar 302 comprises a computer graphic representation of a person's figure in a virtual software environment with controllable body movement abilities. Each surface model 250 also comprises a computer graphic representation of the person's figure but is not capable of the controllable body movements implemented by the avatar 302. The surface models can be created using different body measuring methods (for example, a 2-photo method, a LiDAR scanning method, and/or a hand measurement method). Body movement of the avatar 302 can be controlled by the individual 144 of FIG. 1 via user software interactions with the computing device(s). The body movement can include, but is not limited to, arm movement (e.g., up, down, circular and/or bending movements), leg movement (e.g., up, down and/or bending movements), waist movement (e.g., circular or bending movements), walking movement, running movement, body turning movements to change the perspective view of the avatar being seen by the individual 144, head turning movement and/or neck bending movement.

Figure 5:
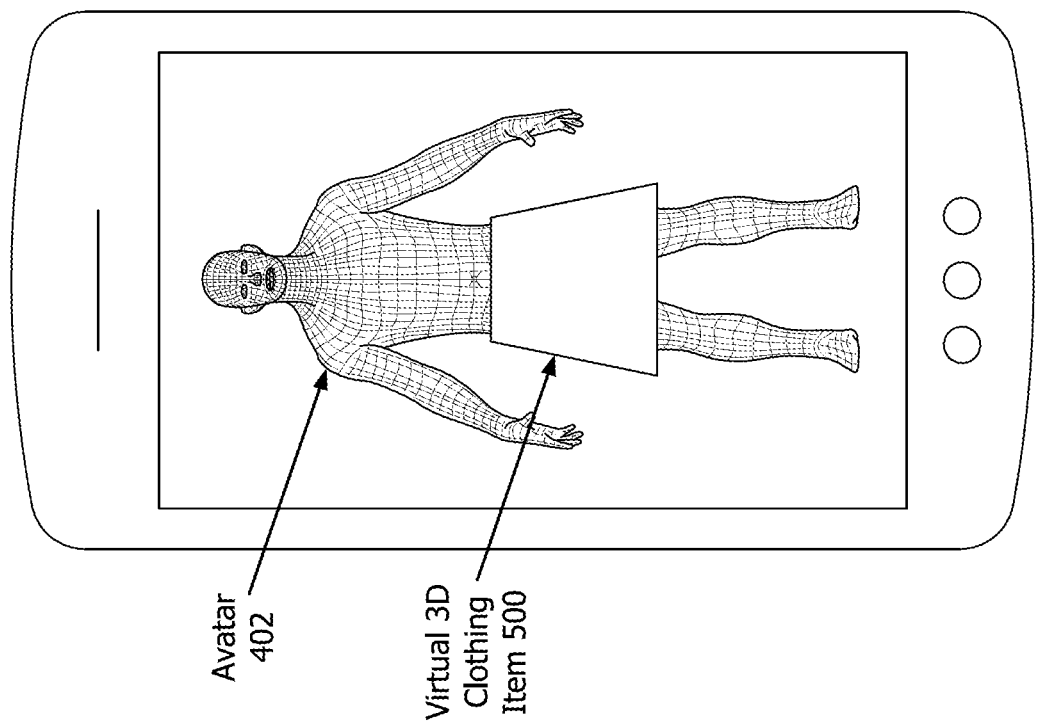
FIG. 5 provides an illustration showing a virtual clothing item applied to the avatar of FIG. 4.

In 308-310, the server(s) 112 also perform(s) operations to obtain a 2D or 3D description of a style from the technical specification 128 of FIG. 1 and optionally convert(s) 2D or 3D measurements of the 2D or 3D description into a virtual 3D clothing item. An illustration of a virtual 3D clothing item 500 is shown in FIG. 5. The virtual 3D clothing item may then be applied to the avatar in 312. An illustration showing the virtual 3D clothing item 500 applied to the avatar 400 is provided in FIG. 5. Any known or to be known technique for applying virtual clothing to an avatar can be used here.

312 can employ: (i) algorithms that consider how the fabric properties (including weight of the fabric, composition of the fabric and/or elasticity of the fabric) will impact the overall fit of the virtual 3D clothing item on the avatar and/or 3D graphical representation of the individual; and/or (ii) algorithms that adjust the overall fit of the virtual clothing item on the avatar based on the impact of a garments construction to the elasticity or other properties that affect how a clothing item will drape, hang, manifest and react to movements on the avatar or 3D graphical representation of the individual. In some scenarios, the avatar is absent of facial features and other features of the individual so that the avatar appears to have some generic features.

The result of 312 provides a virtual representation of how the corresponding physical clothing item would actually fit the individual 144 in the real-world in a holistic and granular manner. In this regard, the virtual representation shows how the clothing item fits on each body part while the wearer is one or more body positions and/or while the wearer is performing one or more physical activities such as walking or running.

In optional 314-316, the server(s) 122 perform operations to adjust the size of the clothing item one or more times and evaluate how the clothing item (with the adjusted size(s)) fits the individual. This evaluation can involve: comparing the body measurements to reference measurements associated with a plurality of clothing items having different styles, sizes and brand associations; identifying clothing items based on results from the comparisons; analyzing how a fabric elasticity and a garment construction could impact a fit of each identified clothing item relative to each of a plurality of body parts of the individual; and/or filtering the clothing items based on results of the analysis and fit preferences of the individual.

Additionally or alternatively, the operations of 314-316 can involve adjusting the size of the virtual 3D clothing item one or more times and evaluating how the virtual 3D clothing item (with the adjusted size(s)) fits the avatar 302 and/or the 3D graphical representation of the individual's body (for example, surface model 250 of FIG. 2). The results of this evaluation can be used to make conclusions as to how the corresponding physical clothing item would fit the individual 144. For example, the server(s) 112 may conclude that the physical clothing item (for example, a skirt) having a small size would be tight around the waist of the individual 144 and/or could not be slid over the individual's hips. The present solution is not limited to the particulars of this example.

The evaluation of 316 can consider (1) how the fabric properties (including weight of the fabric, composition of the fabric and/or elasticity of the fabric) will impact the overall fit of the corresponding physical clothing item on the individual, (2) how the elasticity/stretching of the fabric will impact the fit of the actual clothing item on different parts of the individual's actual body, and/or (3) how a garment's construction may impact the elasticity or other properties that affect how a clothing item will drape, hang, manifest and react to movements on the individual's body. For example, the virtual 3D clothing item in a small size is tight around the waist of the avatar, but the fabric of the corresponding physical clothing item is elastic or otherwise can stretch by a certain amount. This elasticity or stretching feature allows the physical clothing item to fit around waists having measurements falling in a given range (for example, 28-30 inches). The system is able to understand this principle and adjust the virtual clothing item's fit around the waist of the avatar accordingly (for example, increases the waist size of the virtual clothing item to the maximum value for the variable waist size due to fabric elasticity/stretchability). The present solution is not limited to the particulars of this example.

In 318, results of the evaluation performed in 316 are used to determine whether the corresponding physical clothing item of a given size is a good-fit for the individual 144 in accordance with the individual's body shape and/or clothing fit preferences. For example, the individual prefers to have her skirts sit on her hips and/or end at knee level. The server(s) 112 may determine that a skirt with a small size would not be a good-fit for the individual since it would be tight around her waist/hips and/or would end a few inches above her knees. However, the server(s) 112 may determine that the skirt having a medium size would be a good-fit for the individual since it would not be tight around her waist/hips and/or would extend down to her knees. The present solution is not limited to the particulars of this example.

In optional 320, the system makes a clothing size recommendation to the individual when a determination is made that a physical clothing item of the given size is a good fit. The clothing recommendation could include, but is not limited to an identifier for the physical clothing item, a recommended size of the clothing item, an identifier of the brand of clothing, an identifier for one or more business entities offering the physical clothing item for sale, information indicating whether the physical clothing item is in stock, information specifying different color, patterns and/or features available for the physical clothing item, and/or a price for the physical clothing item. The recommendation may also identify one or more other clothing items that are predicted to have a similar or better fit to the individual's body as the recommended physical clothing item. Subsequently, 322 is performed where method 300 ends or other operations are performed (for example, return to 302).

In 318-320, the server(s) 112 may initially qualify or disqualify sizes for an individual based on the ability of the clothing item to fit over all of the parts of his(her) body. Thereafter, the server(s) 112 perform(s) a process to iterate qualifying sizes until sequential parts of the body will not fit the style. When multiple sizes qualify, the weighted rules identifying the hierarchy of the measurements, in the particular style, determine the highest scoring size. The iterations ultimately determine a style/size recommendation that fits all parts of the body. The server(s) 112 then provide(s) the individual 142/144 with a description of how the recommended style/size will fit different parts of his(her) body, given that it is not a custom fit. The server(s) 112 consider(s) how the elasticity of fabric for a clothing item will accommodate parts of the individual's body that would require a different style/size recommendation in a more or less elastic fabric. The iteration logic considers key construction parameters that impact fit in a similar manner. The system creates a fit function for different parts of the body and computes a score using the fit function for each body part with different weights assigned to them depending on the clothing items to be matched and so on.

The iteration logic also considers specific criteria established by third parties for required appearance standards. If the service provider system 106 is being used to provide recommendations for uniforms, a client's visual appearance standards may establish criteria that must conform with the image intentions of the client. These criteria could establish layering standards (e.g., suit jackets must fully close over all underlying garments in the uniform set) and standards related to length and ease (how tight or loose is acceptable).

The matching process requires that an individual's body measurements are available for the key areas of his(her) body that will be enveloped by the selected item. The service provider system 106 is able to request the needed measurements on demand for any style in the library 126 at any time. This is not a recreation of a manual process and could not be done through a manual process.

The size-matching algorithm matches the needed measurements to the optimal size by using algorithms that do a sequential comparison of how a 3D manifestation of the technical specifications will fit the individual's unique body in accordance with the preferences of the individual and, if relevant, an employer for a uniform.

Client Management Service

The client management service provides the individual 144 with information describing how the item will fit different parts of his(her) body and similarly how a larger or smaller size would fit, allowing the individual to understand the basis for the size selection and determine if that matches his(her) preferences. The service provider system 106 allows the user 142, 144 to receive this information for multiple styles of different clothing companies or brands simultaneously, concurrently, or sequentially. The information may be provided through alternative sources before and after delivery. The guidance may be provided before purchase or delivery of clothing item(s) using the app on the client device 102 and/or through data feeds to vendors that can display the information on their ecommerce websites. The guidance may be provided after purchase or delivery using a software function on the app called BodiGuide. BodiGuide helps a customer review the fit of a product they have purchased and/or received. BodiGuide will confirm the fit on different areas of the body and will help the wearer understand why the size was recommended. The wearer will also be shown the fit of larger and/or smaller size(s) on their body and understand the implications of return, exchange or alterations.

Figure 6:
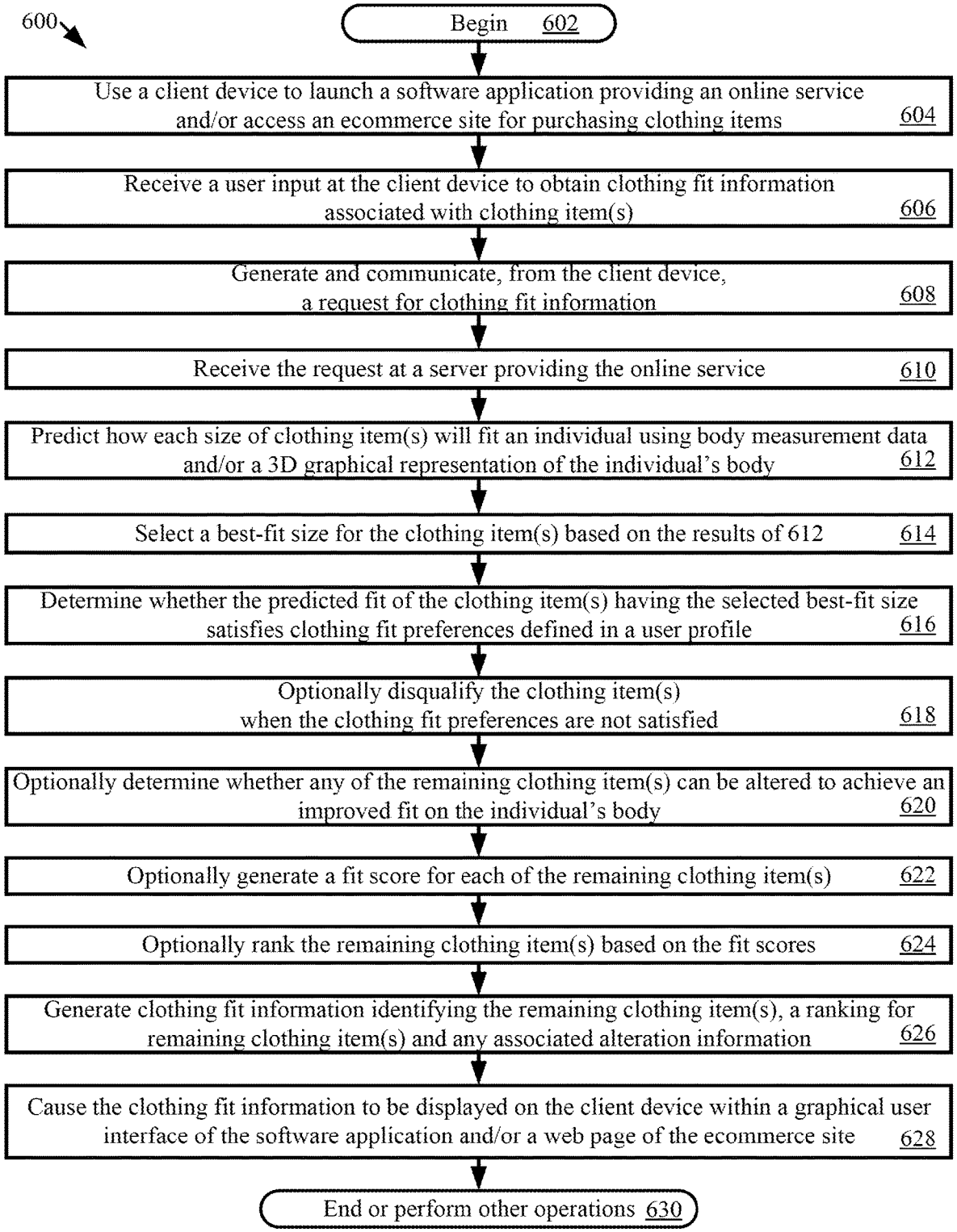
FIG. 6 provides a flow diagram of an illustrative method for providing clothing fit information to individual(s).

Referring now to FIG. 6, there is provided a flow diagram of an illustrative method 600 for providing clothing fit information to individual(s) (for example, individual 142 and/or 144 of FIG. 1) or business(es). Method 600 will be described in the context of an individual. The individual could be a customer (or wearer) or an employee of a business.

Method 600 begins with 602 and continues with 604 where an individual uses a client device (for example, client device 102 of FIG. 1) to launch a software application providing one or more cloud-based services or online services. The cloud-based or online services can include, but are not limited to, a body measurement service, a size-matching service, and/or a client management service. The body measurement service and size-matching service can be the same as that discussed above. The client device can also be used to access an ecommerce website for purchasing clothing items.

Figure 7:
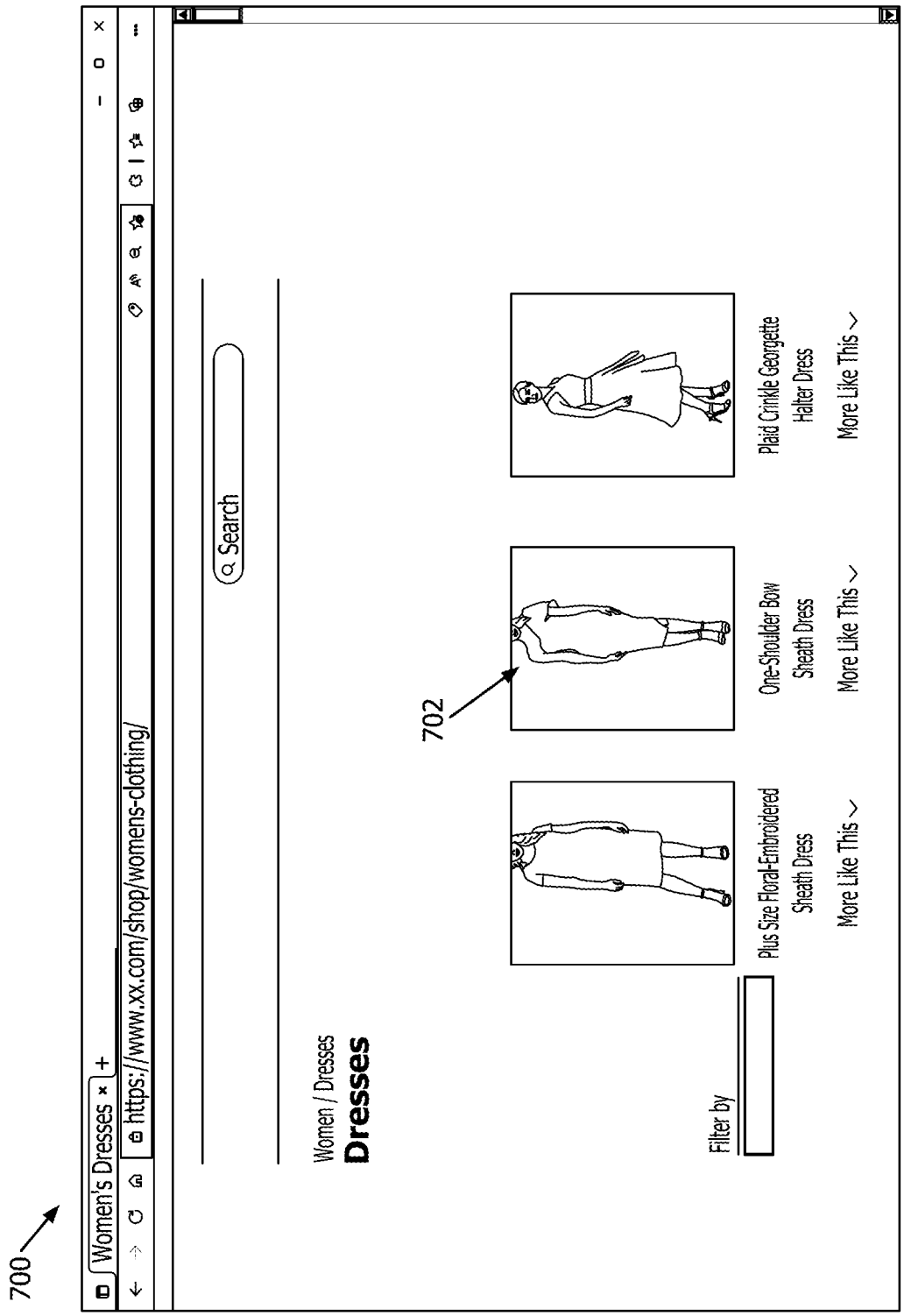
FIG. 7 provides an illustration of a web page of a vendor's website.

An illustration of a web page 700 of an ecommerce website is provided in FIG. 7. In some scenarios, the software application is configured to communicate with the server(s) providing the web page 700 such that the software application is provided with notifications of user-software interactions with the website. For example, the software application may be informed when a user selects a clothing item 702 presented on the web page 700. The present solution is not limited to the particulars of this example.

Figure 8:
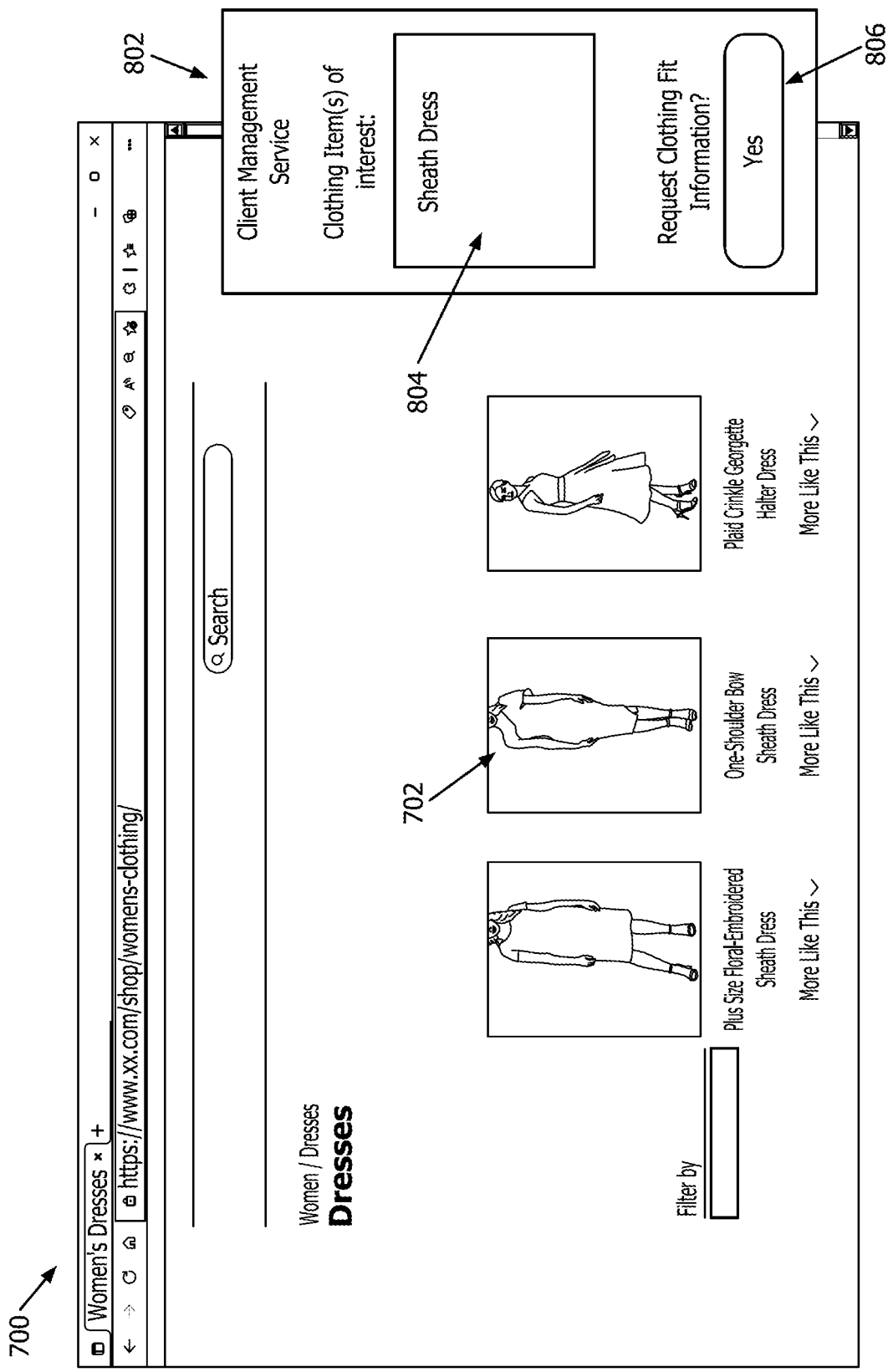
FIG. 8 provides an illustration of a cloud service window displayed along with the web page of FIG. 7.

In 606, the client device receives a user input to obtain clothing fit information associated with one or more clothing item(s). An illustration is provided in FIG. 8 which shows a graphical user interface (GUI) 800 of the software application displayed along with the web page 700. The GUI 800 can be displayed on a display screen of the client device in any position or location relative to the web page 700. For example, the GUI 800 can be at least partially overlaid on top of the web page 700 as shown in FIG. 8. Alternatively, the GUI 800 can be displayed adjacent to the web page 700 in a non-overlapping manner. The GUI 800 comprises one or more means for inputting information into the software application. For example, a text box 804 is provided to allow a user to enter information about one or more clothing items of interest, and a virtual button 806 is provided to allow a user software interaction for requesting clothing fit information from the cloud-based or online service. The present solution is not limited to the particulars of this example.

In some scenarios, the text box 804 is automatically populated with information associated with a clothing item 802 of the web page 700 that was selected by the individual. The information can include, but is not limited to, a brand, an item type (for example, shorts, shirt, skirt, dress, etc.), an item name, an item identifier, a price, a size, a color and/or a pattern name. The individual can modify the information which was automatically inserted into the text box 804 by the software application. The present solution is not limited in this regard.

In 608, the client device generates a request for clothing fit information in response to the user input of 606. The request can include, but is not limited to, a unique identifier for the individual and/or information associated with clothing item(s) of interest (for example, the information input into text box 804 of FIG. 8). The request is communicated from the client device in 608 and received at a server in 610.

At the server, operations are performed in 612 to predict how each size of clothing item(s) will fit the individual. The clothing item(s) can include the item(s) of interest identified in the request and/or other items selected by the server based on the item(s) of interest. For example, the server can identify and select other clothing item(s) which are known to have similar overall designs as the clothing item(s) of interest and/or similar features as the clothing item(s) of interest. This prediction can be made using body measurement data (for example, body measurement data 400 of FIG. 4) and/or a 3D graphical representation of the individual's body (for example, the surface model 250 of FIG. 2) in the same or similar manner as that described above in relation to the size-matching service. Accordingly, the server can perform measurement comparison operations to determine how clothing item(s) will fit each relevant part of the individual's body based on known clothing specifications and the body measurement data and/or perform operations to determine clothing item fit by applying corresponding virtual clothing item(s) to the 3D graphical representation of the individual's body. Results of these operations define predictions as to how clothing item(s) will fit the individual.

In 614, the server selects a best-fit size for each clothing item based on the prediction results of 612. For example, the server selects a medium size for clothing item 702 since the prediction results indicate that the clothing item at this size will not be tight or loose on any relevant part of the individual's body, while the prediction results indicate that the clothing item at other sizes will be tight and/or loose on one or more relevant body parts of the individual. A clothing item may be deemed to be tight on a body part, for example, when the clothing specification values are equal to or less than the body measurement data values and/or when the clothing specification values are greater than the body measurement data values by a threshold amount (for example, 0-1 cm). The clothing item is deemed to be loose on a body part when, for example, the clothing specification values are greater than the body measurement data values by a threshold amount (for example, >0.5 inches). The present solution is not limited to the particulars of this example.

In 616, the server performs operations to determine whether the predicted fit of the clothing item(s) having the selected best-fit size satisfies clothing fit preferences defined in a user profile for the individual. For example, a clothing fit preference for a dress is that it ends at knee level, is of a tighter fit around certain body parts (e.g., hips and stomach) and/or is a looser fit around certain body parts (e.g., shoulders for mobility purposes when reaching upwards). The server uses the clothing specification, body measurement data and/or 3D representation of the individual to determine whether the dress will be of a tight or loose fit around certain body parts, end at knee level, above knee level by a threshold amount (for example, greater than 1 inch) or below knee level by a threshold amount (for example, greater than 1-2 inches). The present solution is not limited in this regard.

The clothing item(s) that do(es) not satisfy the clothing fit preference(s) may be disqualified from any further consideration, as shown by 618. For example, a medium dress is disqualified when it will end above knee level by a threshold amount (for example, greater than 1 inch) or below knee level by a threshold amount (for example, greater than 1-2 inches). The present solution is not limited in this regard.

Next in optional 620, the server can determine whether any of the remaining clothing item(s) can be altered (for example, via tailoring) to achieve an improved fit on the individual's body. For example, in 616, it is determined that a medium dress is expected to end above the individual's knee at a location that is less than a threshold distance therefrom (for example, at a location that is less than 1 inch above the knee of the individual). The clothing specification for this particular clothing item indicates that the hem provides the ability to extend the dress by at least half an inch. It is also determined that a different small dress is expected to end below the individual's knee at a location that is less than a threshold distance therefrom (for example, at a location that is less than 1-2 inches below the knee of the individual). In this case, the server can determine that this dress can be altered to shorten its length by a certain amount such that it can end at knee level. The present solution is not limited to the particulars of this example.

In optional 622, the server can generate a fit score for each remaining clothing item. The fit score can be computed using, for example, a mathematical algorithm in which differences between clothing specification values and body measurement data values are combined in a weighted manner. The mathematical algorithm can be defined as shown below.

$$S=(w_1 \cdot d_1)+(w_2 \cdot d_2)+ \ldots +(w_x \cdot d_x) \quad (1)$$

where S represents a fit score, $w_1, w_2, \ldots, w_x$ each represent a weight, and $d_1, d_2, \ldots, d_x$ each represent a difference between a body measurement data value and a corresponding clothing specification value (for example, a waist measurement of the individual and a waist specification value for a given clothing item). The weights can be pre-defined numbers (for example, integers between 0 and 10) and may be the same or different for different clothing items. The present solution is not limited to mathematical equation (1). For example, the fit score could be a weighted average as shown by mathematical equation (2).

$$S=((w_1 \cdot d_1)+(w_2 \cdot d_2)+ \ldots +(w_X \cdot d_X))/N \quad (2)$$

where X is the total number of different values being combined. Next in optional 624, the server ranks the clothing items based on the fit scores. The clothing items can be ranked from lowest fit score to highest fit score, or vice versa.

In 626, the server performs operations to generate clothing fit information. The clothing fit information can include, but is not limited to, identification information for the remaining clothing item(s), description(s) for the remaining clothing item(s), a ranking for the remaining clothing item(s), fit score(s) for the remaining clothing item(s), fit description(s) of the predicted fit for the remaining clothing item(s), and/or any associated alteration information for the remaining clothing item(s). A fit description can indicate (i) whether one or more portions of a clothing item is predicted to properly fit certain body parts (for example, a waist, an upper arm, a neck, etc.) and/or (ii) whether one or more portions of a clothing item is predicted to be tighter or looser on certain body parts than desired by the clothing designer and/or preferred by the individual (for example, it is predicted that a neck line of a shirt will be looser on the individual's neck than desired by the clothing designer and/or preferred by the individual since its dimensions are larger than the individual's neck dimensions by a certain amount as specified in the clothing specification and/or user profile).

In 628, the server then causes the clothing fit information to be displayed on the client device within the GUI of the software application and/or the web page of the ecommerce website. Clothing fit information can be displayed for all of the remaining clothing item(s) or only a portion of the remaining clothing items. In the latter case, only the top Y remaining clothing items (as specified by the ranking) are displayed, where Y is an integer (for example, any integer between 0 and 100).

Figure 9:
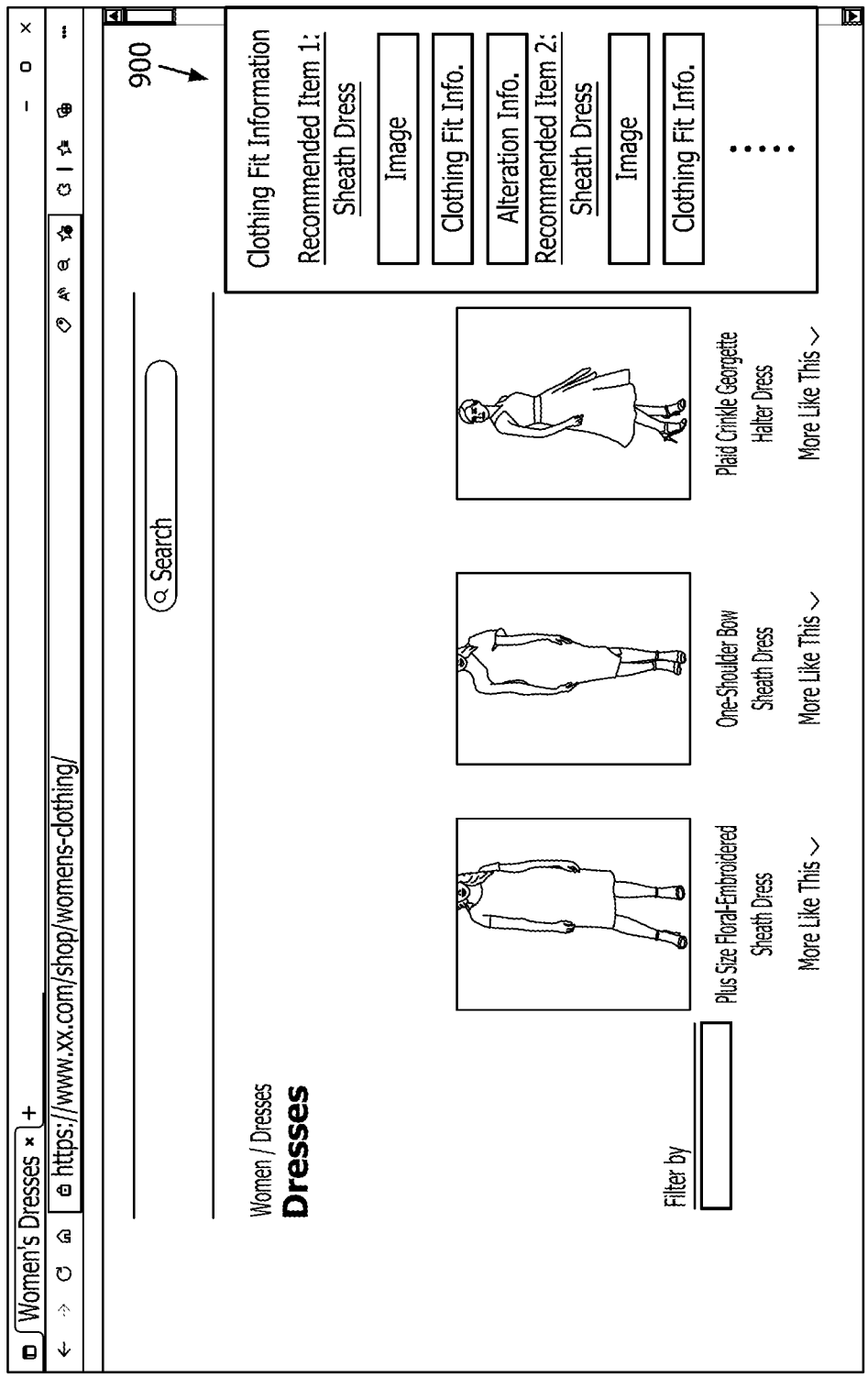
FIG. 9 provides an illustration showing clothing fit information displayed along with the web page of FIG. 7.

An illustration showing clothing fit information 900 displayed on the client device is provided in FIG. 9. The clothing fit information 900 is shown as being displayed in a portion of the web page 700 of the ecommerce site. The present solution is not limited in this regard. The clothing fit information can be presented in a window separate and apart from the Web Browser window in which the web page 700 is being presented. In this scenario, the separate window can be located on the display screen adjacent to the Web Browser window in a non-overlapping manner or located on the display screen so as to at least partially overlap the Web Browser window. The present solution is not limited to the particulars of FIG. 9. Other information may additionally or alternatively be presented on the client device. This other information can include, but is not limited to, information indicating how the size fits different parts of the individual's body. Subsequently, 630 is performed where method 600 ends or other operations are performed (for example, return to 602).

Custom Tailoring Service

The custom tailoring service is generally configured to provide an online service in which automated clothing alterations and/or fabrication can be initiated, monitored, tracked, and completed. This process can involve: determining or otherwise obtaining tailoring specifications for a clothing item based on results of the size matching operations; and causing a person and/or automated tailoring equipment 130, 136 to modify and/or fabricate a clothing item in accordance with the tailoring specifications. The modified/fabricated clothing item may then be provided to the individual 144 via a mail service, an at-facility pick-up service and/or an autonomous delivery service.

Figure 10:
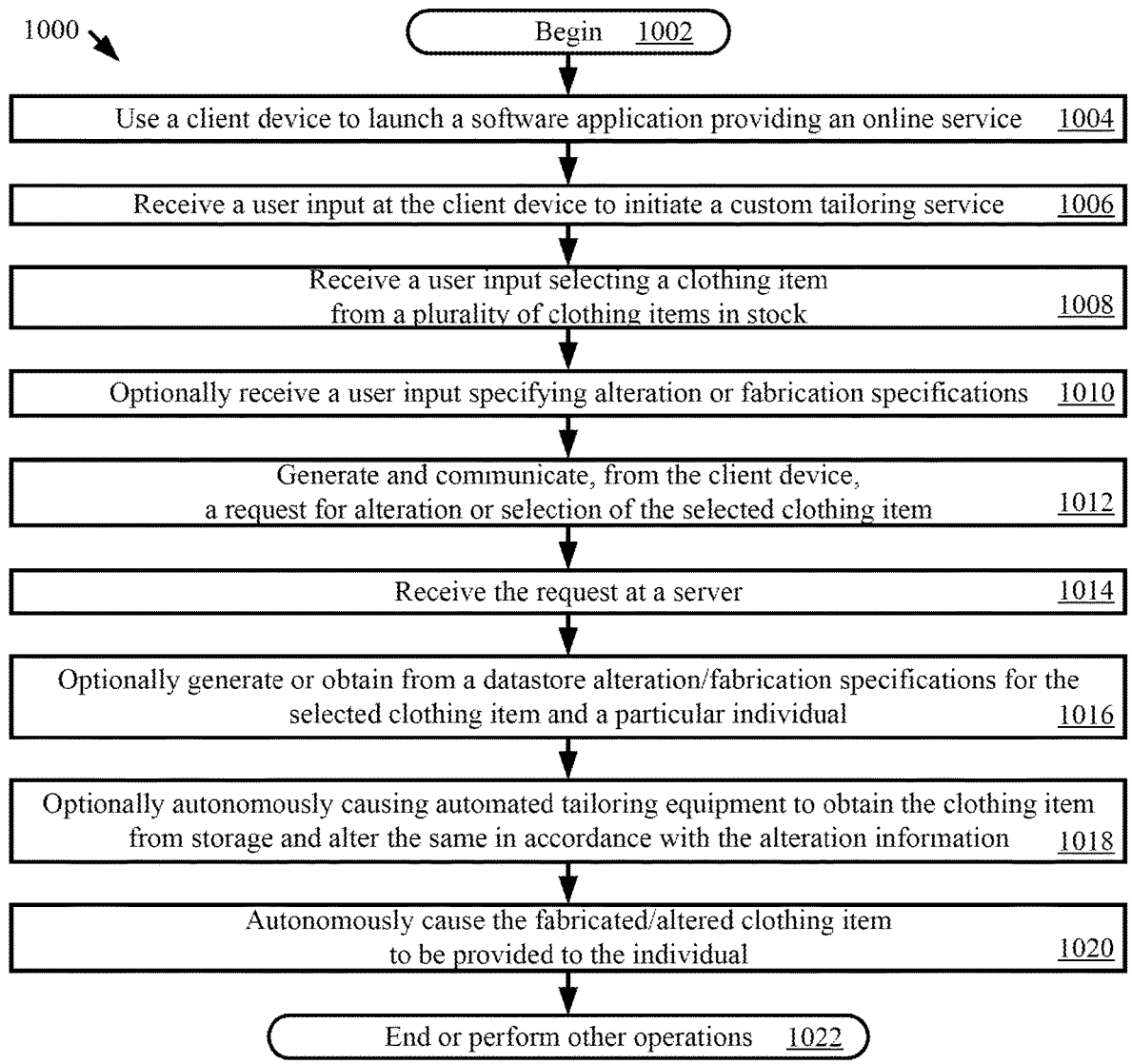
FIG. 10 provides a flow diagram of an illustrative method for providing a custom tailoring service.

Referring now to FIG. 10, there is provided a flow diagram of an illustrative method 1000 for providing a custom tailoring service. Method 1000 begins with 1002 and continues with 1004 where an individual (for example, individual 142 or 144 of FIG. 1) uses a client device (for example, client device 102 of FIG. 1) to launch a software application providing one or more cloud-based services or online services. The cloud-based or online services can include, but are not limited to, a body measurement service, a size-matching service, a client management service, and/or a custom tailoring service. The body measurement service, size-matching service and client management service can be the same as that discussed above. The client device can also be used to access an ecommerce website for purchasing clothing items.

In 1006, the client device receives a user input to initiate a custom tailoring service. Next in 1008, the client device receives a user input to select a clothing item from a plurality of clothing items. This user selection can be made via a widget of a website (for example, website 700 of FIG. 1) or a widget of the GUI (for example, GUI 802 of FIG. 8) of the software application being executed by the client device. The client device may also optionally receive in 1010 a user input specifying alteration or fabrication specifications. The alteration specification can indicate that a clothing item is to be taken in partially at a given location (for example, the waist) by a certain amount, is to have its length decreased by a certain amount, and/or is to have its length increased by a certain amount. The fabrication specifications can include information that is typically provided to a tailor, seamstress or clothing fabricator for making a piece of clothing.

Thereafter in 1012, the client device generates a request for alteration or fabrication of the selected clothing item. The request is communicated from the client device in 1012 and received at a computing device (for example, computing device 108 of FIG. 1, server 112 of FIG. 1 and/or computing device 134 of FIG. 1) at 1014.

In optional 1016, the computing device generates alteration or fabrication specifications for the selected clothing item using a user profile, a 3D graphical representation of an individual (for example, surface model 250 of FIG. 2 and/or an avatar 402 of FIG. 4), body measurement data (for example, body measurement data 400 of FIG. 4), and/or historical clothing alteration/fabrication data associated with the individual. Machine learning models can be used to generate alteration or fabrication specifications for the individual. The machine learning models can be trained to generate alteration or fabrication specifications for individual(s) based on one or more of the following input information: clothing type; clothing style; fabric type; fabric color or pattern; specifications for existing clothing items; historical alteration or fabrication data associated with the individual; prior clothing purchases by the individual; comments received from the individual about prior clothing purchases, alterations and/or fabrications; body types; body measurement data; and/or 3D surface models for individuals. The machine learning models can also provide a confidence value reflecting the degree of confidence that a clothing item altered/fabricated in accordance with given alteration/fabrication specifications will be a good-fit for the individual's body. Alternatively or additionally, the computing device obtains from a datastore (for example, datastore 114 of FIG. 1) alternation or fabrication specifications for the selected clothing item that is associated with the individual. The alteration specification can include, but is not limited to, the alteration suggestions made by the client management service which were described above.

In optional 1018, the computing device performs operations to autonomously cause automated tailoring equipment (for example, equipment 130 and/or 134 of FIG. 1) to (i) obtain a clothing item from a storage location (for example, a stack room 150 of FIG. 1) and alter the same in accordance with the alteration specification or (ii) fabricate a new clothing item in accordance with the fabrication specification. Any known or to be known automated tailoring equipment can be used here. The automated tailoring equipment can include, but is not limited to, conveyors, articulating arms for obtaining fabric and/or clothing item(s) from storage location(s) and moving the same to a support structure of the tailoring equipment, an automated cutting machine and/or an automated sewing machine.

In 1020, the computing device causes the altered clothing item or the new fabricated clothing item to be provided to the individual. The delivery of the clothing item can be achieved using a postal service, an in-person pick-up service, and/or an autonomous delivery service. Any known or to be known postal service, an in-person pick-up service, and/or an autonomous delivery service can be used here. Subsequently, 1022 is performed where method 1000 ends or other operations are performed (for example, return to 1002).

Product Improvement Service

The product improvement service is generally configured to assist clothing providers and/or manufacturers with improving their clothing items based on a database of body measurement data for a plurality of individuals (for example, all or some of the subscribers to the online body measurement service), 3D graphical representations of the plurality of individuals, and/or historical fit information associated with the plurality of individuals (for example, obtained by the client management service).

Figure 11:
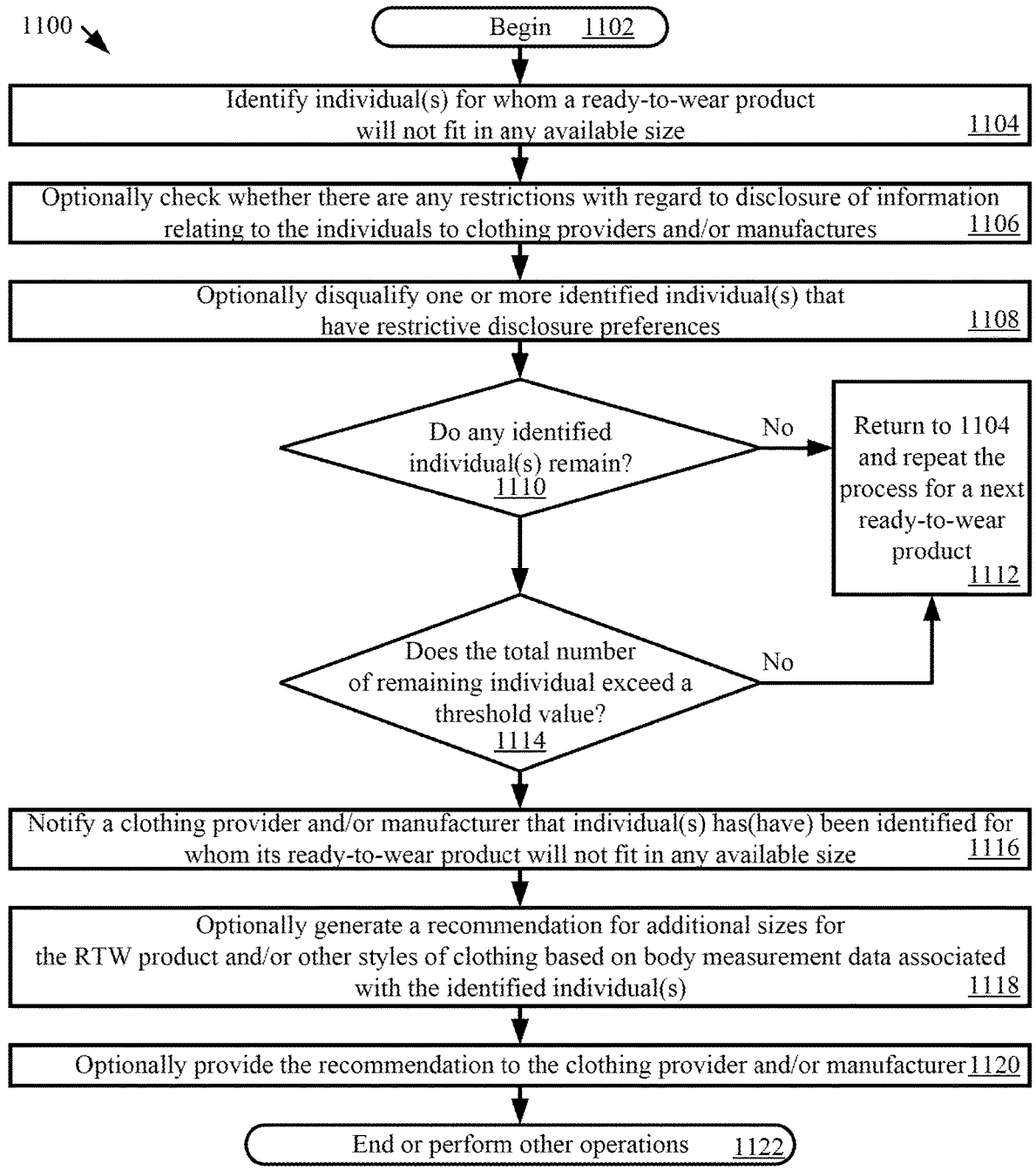
FIG. 11 provides a flow diagram of an illustrative method to facilitate product improvement by clothing providers and/or manufacturers.

FIG. 11 provides a flow diagram of an illustrative method 1100 to facilitate product improvement by clothing providers and/or manufacturers. Method 1100 begins with 1102 and continues with 1104 where a computing device (for example, server(s) 112 of FIG. 1) accesses information stored in a datastore (for example, datastore 114 of FIG. 1) to identify individual(s) for whom a RTW product will not fit in any available sizes.

Next in 1106, the computing devices verify or otherwise check whether there are any restrictions with regard to disclosure of information relating to the identified individual(s) to clothing providers and/or manufacturers. For example, each subscriber to one or more online services described herein can control privacy settings in his(her) user profile. The privacy settings can specify whether or not the subscriber authorizes disclosure of information acquired by the system to other parties including clothing providers and/or manufacturers. Accordingly, in 1108, one or more subscribers can be disqualified when they are associated with restrictive disclosure preferences.

In 1110, the computing device determines whether one or more identified individuals remain. If not [1110:NO], then method 1110 returns to 1104 so that the process can be repeated for a next RTW product, as shown by 1112. If so [1110:YES], then the computing device determines where the total number of remaining individuals exceeds a threshold value. The threshold value can include an integer greater than zero. The threshold value can be predefined by the clothing provider and/or manufacturer. Alternatively, the threshold value can be dynamically selected based on a total number of sales for the RTW product or a similar RTW product of the clothing provider and/or manufacturer. In this case, the threshold value may change over time based on historical sales information.

If the total number of remaining individuals does not exceed the threshold value [1114:NO], then method 1100 goes to 1112 which is discussed above. In contrast, if the total number of remaining individuals is equal to or greater than the threshold value [1114:YES], then method 1100 continues with 1116 wherein the computing device notifies the clothing provider and/or manufacturer that individual(s) has(have) been identified for whom its RTW product will not fit in any available size. The notification can be provided to the clothing provider and/or manufacturer as part of a product improvement service and may be stored in datastore(s) (for example, datastore 114 and/or 138 of FIG. 1). The datastore(s) can be part of the clothing provider or manufacture system(s) (for example, system 132 of FIG. 1). 1116 could also involve providing a recommendation that another size or style should be created. This could result in a decision by the business entity to create the technical specifications for an additional size and/or a different style that would fit the body shapes of the outlier individuals better.

The notification can include link(s) to access a table or other report including body measurement data associated with each of the remaining individual(s). The body measurement data may be derived from 3D graphical representations of the individuals' bodies as described above (for example, in relation to FIG. 4). This information allows the clothing provider and/or manufacturer to have knowledge of the magnitude and/or frequency of clothing fit issues for particular body shapes and/or sizes. In the case of a uniform, the information may identify individuals for whom a custom fit will be necessary and creates data to determine the potential need for additional incremental sizes and styles.

In 1118, the computing device may generate a recommendation for additional sizes and/or styles for the RTW product and/or other styles of clothing based on body measurement data associated with the identified individual(s). The recommendation can be provided to the clothing provider and/or manufacturer in 1120. Subsequently, 1122 is performed where method 1100 ends or other operations are performed (for example, return to 1102).

A feedback loop from the size-matching process provides information available to clothing companies and manufacturers that can be used to adjust their manufacturing specifications. Depending on the brand, this can be done in a manner that responds quickly, such that clothing specifications could be adjusted or additional styles created that better fit groups of people with body shapes that fit respective styles poorly. The matching results could be input to cause remote manufacturing equipment (for example, equipment 136 of FIG. 1) to manufacture a product to new specifications.

Virtual Fit Safari Service

Figure 12:
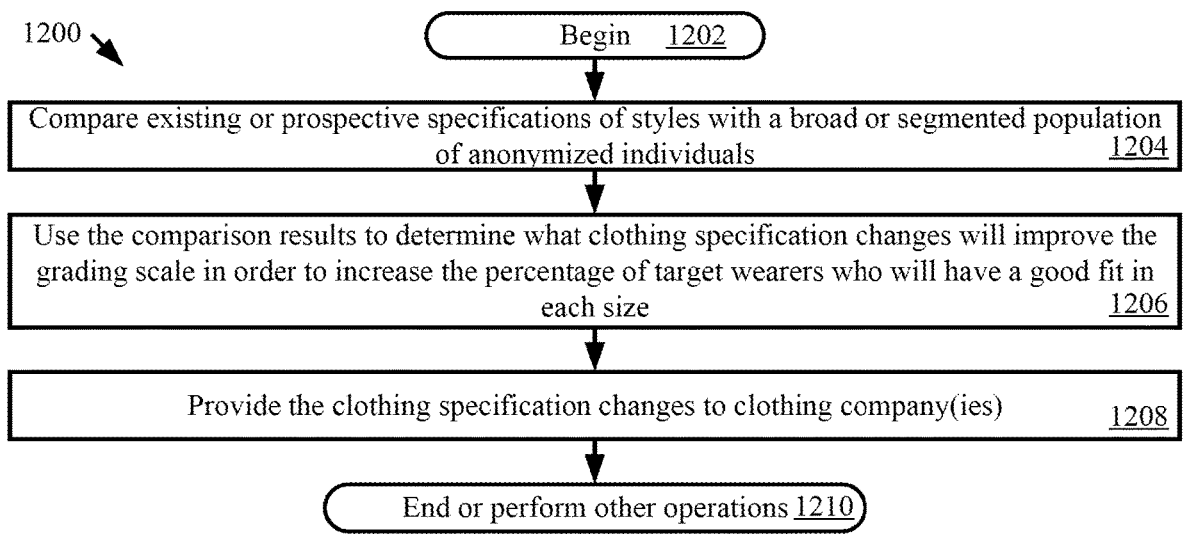
FIG. 12 provides a flow diagram of an illustrative process implementing the virtual fit safari service.

The virtual fit safari service uses the body measurement profile database on an anonymized aggregated basis to help clothing companies improve the design of existing and future clothing items. FIG. 12 provides a flow diagram of an illustrative process 1200 implementing the virtual fit safari service.

As shown in FIG. 12, process 1200 begins with 1202 and continues with 1204 where the computing device (for example, server(s) 112 of FIG. 1) performs operations to compare the existing or prospective specifications of styles with a broad or segmented population of anonymized individuals. The comparison is made against a variety of measurements over an entire grading scale for a style. Results of the comparison are used in 1206 to determine what specification changes will improve the grading scale and/or measurements in order to increase the percentage of target wearers who will have a good fit in each size. For example, this determination can facilitate establishment of a new grading scale and/or identification of adjustments that can be made to base measurements, which impacts both the measurement sand the relationship between different garment measurements within a size. The analysis may also result in a determination of a recommendation for size distribution to optimize for broad or segmented population. There are many benefits of trying on each clothing style's size on a virtual subset of the population such as how the styles fit over women having different body shapes and/or from different geographic locations. The specification changes may then be provided to the clothing companies in 1208. Subsequently, 1210 is performed where method 1200 ends or other operations are performed.

Some clothing companies do occasionally manually examine the quality of fit on a variety of people. However, the manual examinations cannot do a comparable analysis to the automated analysis of the service provider system 100. The service provider system 100 is able to compare many more measurements that are consistently measured and not subject to human error (there is a common statement that 10 tailors measuring the same individual will get 10 different sets of measurements), against a database of significantly more individuals (physical examinations involve hundreds of people, while the automated examination of the service provider system 100 involves hundreds of thousands of individuals in a less amount of time with more accurate results).

Figure 13:
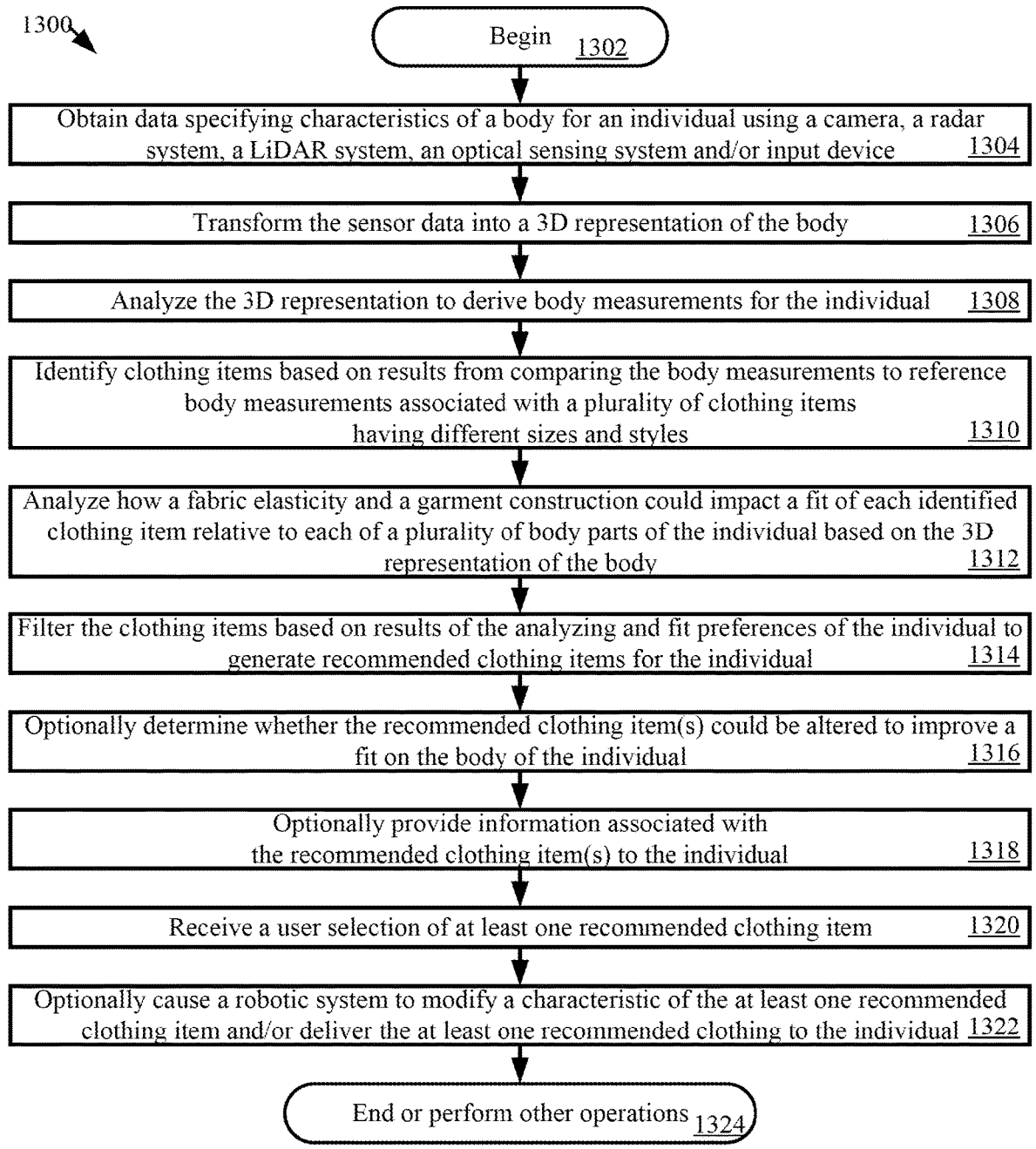
FIG. 13 provides a flow diagram of an illustrative method for automating clothing transactions.

Referring now to FIG. 13, there is provided a flow diagram of an illustrative method 1300 for automating clothing transactions in accordance with the present solution. Method 1300 begins with 1302 and continues with 1304 where a computing device (e.g., server 112 of FIG. 1) obtains data specifying characteristics of a body for an individual (e.g., individual 144 of FIG. 1). The data may comprise sensor data generated by a client device (e.g., client device 102 of FIG. 1) using a camera, a radar system, a LiDAR system and/or an optical sensing system. The data may additional or alternatively comprise self-measurement information input into the client device via an input device (e.g., a touch screen and/or keyboard). The self-measurement information can be acquired using a measuring tape. Other information may also be obtained in 1304 such as user-defined body measurements.

Next in 1306, the computing device performs operations to transform the sensor data and/or other information into a 3D representation of the body. This transformation can be achieved in the same or similar manner as that described in the '172 Patent referenced above and/or U.S. patent Ser. No. 16/353,016, which are incorporated herein by references in their entireties. The 3D representation is analyzed in 1308 to derive precise and/or predicted body measurements for the individual.

In 1310, the computing device identifies clothing items based on results from comparing the body measurements to reference body measurements associated with a plurality of clothing items having different styles, sizes and brand associations. Once the clothing items have been identified, the computing device performs operations in 1312 to analyze how a fabric elasticity, fabric weight, fabric drape properties and a garment construction could impact a fit of each identified clothing item relative to each given body part (e.g., upper arm, thigh, neck, etc.) of the individual based on the 3D graphical representation of the body (for example, surface model 250 of FIG. 2 or avatar 402 of FIG. 4). This analysis can be achieved using pre-defined information stored in LUTs and/or machine learning algorithms and/or models. The machine learning algorithms/models can be trained to make predications as to how fabric elasticity, fabric weight, fabric drape properties and/or a garment construction could impact a fit of clothing item(s) relative one or more body parts of a human. Any known or to be known machine learning algorithm/model can be used here.

In some scenarios, the machine-learning algorithm includes, but is not limited to, a decision tree learning algorithm, an association rule learning algorithm, an artificial neural network learning algorithm, a deep learning algorithm, an inductive logic programming based algorithm, a support vector machine based algorithm, a clustering based algorithm, a Bayesian network based algorithm, a representation learning algorithm, a similarity and metric learning algorithm, a sparse dictionary learning algorithm, a genetic algorithm, a rule-based machine learning algorithm, and/or a learning classifier systems based algorithm. Each of these listed types of machine-learning algorithms are well known in the art, and therefore will not be described herein. The machine-learning process implemented by the present solution can be built using Commercial-Off-The-Shelf ("COTS") tools (e.g., SAS available from SAS Institute Inc. of Cary, N.C.).

The identified clothing items are filtered based on results of this analysis and fit preferences of the individual, as shown by 1314. The filtering may include disqualifying at least one of the clothing items which was identified from being a recommended clothing item when the fit preferences of the individual would not be met if the at least one clothing item is worn by the individual. The remaining clothing items are then considered recommended clothing items for the individual.

In 1316, the computing device optionally determines whether any of the recommended clothing items could be altered to improve a fit on the body of the individual. Next in 1318, the computing device provides information associated with the recommended clothing items to the client device for presentation to the user. This information can include, but is not limited to, clothing item identifiers, clothing item descriptions, clothing item brands, clothing item prices, business entities from which the clothing item can be obtained, availability of the clothing item, and/or alteration recommendations (e.g., shortening a skirt, reducing a waist, adding stitching or emblem to a shirt, etc.).

The user can then perform user-software interactions with the client device for selecting recommended clothing item(s), as shown by 1320. Information specifying which recommended clothing items were selected is provided from the client device to the computing device.

In response to receiving the user's selection of recommended clothing item(s), the computing device may optionally perform operations in 1322 to cause a purchase transaction to be completed, a robotic system (e.g., robotic system 160 and/or automated tailoring equipment 130 of FIG. 1) to modify a characteristic of the recommended clothing item(s), and/or cause the robotic system to deliver the clothing item(s) to the individual. The robotic system can comprise a mobile platform such as an autonomous vehicle. The anonymous vehicle can include, but is not limited to, a land vehicle, an aircraft, a watercraft, or a subterrene. Subsequently, 1324 is performed where method 1300 ends or other operations are performed.

The other operations can include, but are not limited to, returning to 1302 and/or operations of methods 300 of FIG. 3, 600 of FIG. 6, 1000 of FIG. 10, 1100 of FIG. 11 and/or 1200 of FIG. 12. For example, method 1300 could also involve: using the body measurements to generate an avatar for a person in a virtual computing environment; obtaining a virtual 3D clothing item for one of the clothing items which was identified based on results from comparing the body measurements to reference measurements; applying the virtual 3D clothing item to the avatar; evaluating how the virtual 3D clothing item fits a body of the avatar; adjusting a size of the virtual 3D clothing item; re-evaluating how the virtual 3D clothing item fits the body of the avatar; and/or determining whether one or more of the virtual 3D clothing items could be altered to improve a fit on the body of the avatar.

Method 1300 could additionally or alternatively involve: generating a fit score for each of the recommended clothing items; ranking the recommended clothing items based on the fit scores; causing information associated with the recommended clothing items to be displayed on another computing device within a graphical user interface of a software application or within a web page of an ecommerce site (for example, in accordance with the ranking); receiving a user input requesting alteration of a clothing item; autonomously causing automated tailoring equipment to obtain and alter the clothing item; and/or causing an autonomous vehicle to obtain and deliver the clothing item which has been altered to the individual.

Method 1300 could additionally or alternatively involve: identifying at least one person of a plurality of persons for whom a ready-to-wear product would not fit in any available size based on body measurement information for the plurality of persons and reference measurement information associated with the ready-to-wear product; generating a recommendation for an additional size for the ready-to-wear product based on the body measurement information for the plurality of persons; and/or providing the recommendation for the additional size to a business entity providing the ready-to-wear product.

Method 1300 could additionally or alternatively involve: comparing a clothing specification for a clothing item to body measurements for a plurality of anonymized individuals to determine recommended changes to the clothing specification for improving a fit of the clothing item; and/or providing the recommendation changes to the clothing specification to a business entity associated with the clothing item.

The implementing systems of the above-described methods can comprise: a processor; and a non-transitory computer-readable storage medium comprising programming instructions that are configured to cause the processor to implement a method for operating a computing system. The above-described methods can also be implemented by a computer program product comprising memory and programming instructions that are configured to cause a processor to perform operations.

The present solution is described above in relation to various online services and methods. The present solution is not limited to the order in which the operations of the online services and/or methods are presented. The operations of methods 300 of FIG. 3, 600 of FIG. 6, 1000 of FIG. 10, 1100 of FIG. 11, 1200 of FIG. 12 and/or 1300 of FIG. 13 can be combined into a single method in which the operations are performed in the same or different order than that shown. Also, some of the operations could be performed in parallel rather than in a serial manner as shown in FIGS. 3, 6, 10, 11, 12 and/or 13.

Figure 14:
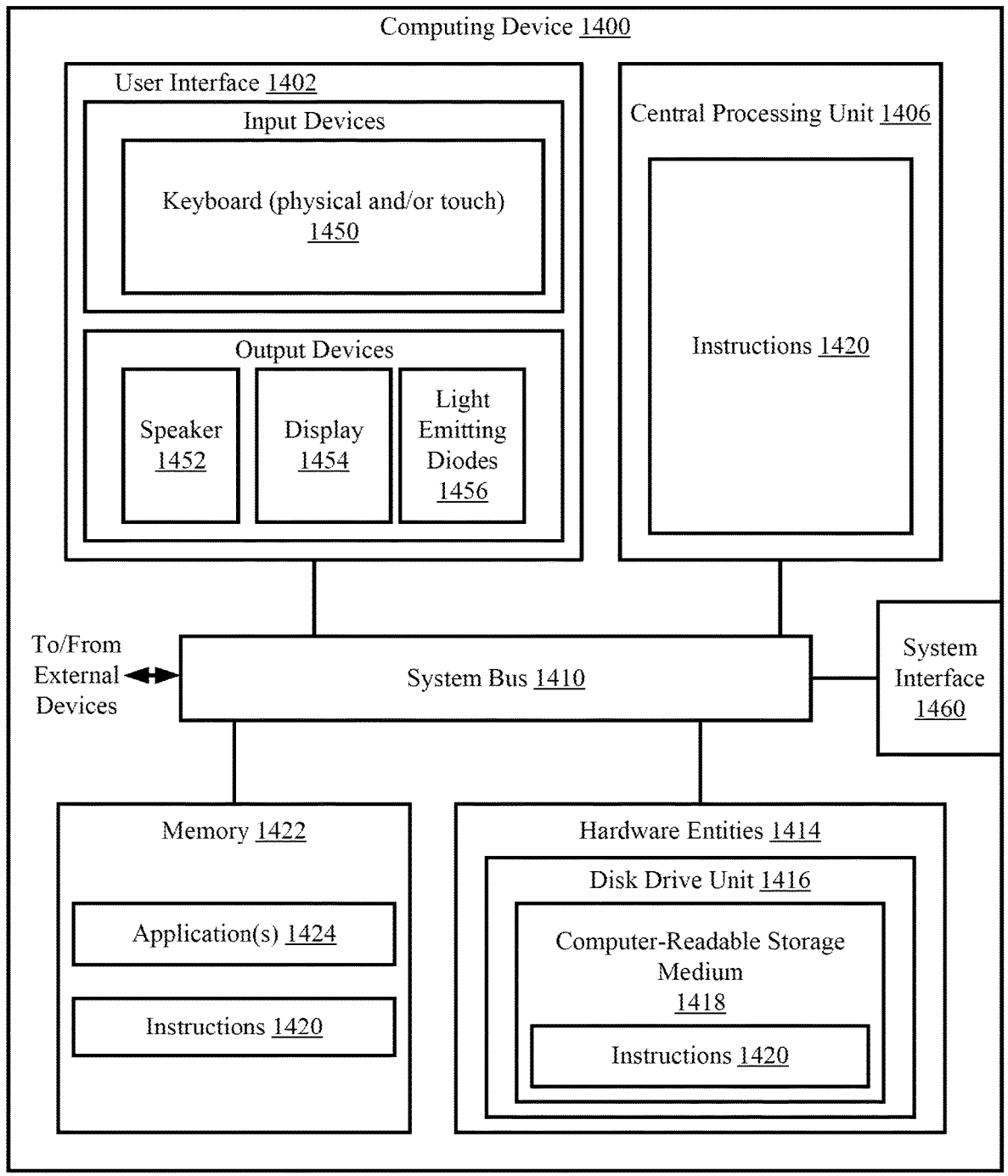
FIG. 14 is an illustration of a computing device.

Referring now to FIG. 14, there is provided an illustration of an illustrative architecture for a computing device 1400. The client device(s) 102, computing device 108, 124, server(s) 112 and/or equipment 130, 136 of FIG. 1 is/are the same as or similar to computing device 1400. As such, the discussion of computing device 1400 is sufficient for understanding the listed devices of FIG. 1.

Computing device 1400 may include more or less components than those shown in FIG. 14. However, the components shown are sufficient to disclose an illustrative solution implementing the present solution. The hardware architecture of FIG. 14 represents one implementation of a representative computing device configured to facilitate access to services as described herein. As such, the computing device 1400 of FIG. 14 implements at least a portion of the method(s) described herein.

Some or all components of the computing device 1400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 14, the computing device 1400 comprises a user interface 1402, a Central Processing Unit (CPU) 1406, a system bus 1410, a memory 1422 connected to and accessible by other portions of computing device 1400 through system bus 1410, a system interface 1460, and hardware entities 1414 connected to system bus 1410. The user interface can include input devices and output devices, which facilitate user-software interactions for controlling operations of the computing device 1400. The input devices include, but are not limited to, a physical and/or touch keyboard 1450. The input devices can be connected to the computing device 1400 via a wired or wireless connection (e.g., a Bluetooth® connection). The output devices include, but are not limited to, a speaker 1452, a display 1454, and/or light-emitting diodes 1456. System interface 1460 is configured to facilitate wired or wireless communications to and from external devices (e.g., network nodes such as access points, etc.).

At least some of the hardware entities 1414 perform actions involving access to and use of memory 1422, which can be a Random Access Memory (RAM), a disk drive, flash memory, a Compact Disc Read Only Memory (CD-ROM) and/or another hardware device that is capable of storing instructions and data. Hardware entities 1414 can include a disk drive unit 1416 comprising a computer-readable storage medium 1418 on which is stored one or more sets of instructions 1420 (e.g., software code) configured to implement one or more of the methodologies, procedures, or functions described herein. The instructions 1420 can also reside, completely or at least partially, within the memory 1422 and/or within the CPU 1406 during execution thereof by the computing device 1400. The memory 1422 and the CPU 1406 also can constitute machine-readable media. The term "machine-readable media", as used here, refers to a single medium or multiple media (e.g., a centralized or distributed database, and/or associated caches and servers) that store the one or more sets of instructions 1420. The term "machine-readable media", as used here, also refers to any medium that is capable of storing, encoding or carrying a set of instructions 1420 for execution by the computing device 1400 and that causes the computing device 1400 to perform any one or more of the methodologies of the present disclosure.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for automating clothing transactions, comprising:

generating, by one or more first sensors, first sensor data comprising measured parameters of a surrounding environment;

accessing, by a computing device, a datastore to obtain stored condition information specifying a threshold range defining a specific condition when each of a plurality of different body measurement techniques should or should not be employed;

identifying, by the computing device, a parameter of the measured parameters that falls outside of the threshold range;

autonomously selecting, by the computing device, one or more measurement techniques from the plurality of different body measurement techniques based on the identified parameter, the plurality of different body measurement techniques comprising two or more of a camera-based technique, a radar-based technique, a lidar-based technique, an optical-based technique, and a self-measurement-based technique;

using the selected one or more measurement techniques to create a 3D graphical representation of a body for an individual in a computing environment, by:

obtaining, by a computing device, at least one of user input data from a self-measurement-based technique and second sensor data specifying characteristics of the body for the individual, the second sensor data being generated using at least one of a camera, a radar system, a LiDAR system, and an optical sensing system;

and transforming, by the computing device, the characteristics of the body specified by the user input data and/or the sensor data into the 3D graphical representation of the body comprising a surface model or an avatar in the computing environment;

analyzing, by the computing device, the 3D graphical representation to derive 3D body measurements for the individual;

identifying, by the computing device, clothing items and sizes thereof based on results from comparing the 3D body measurements to reference measurements associated with a plurality of clothing items having different styles, sizes and brand associations;

providing, by the computing device, the 3D graphical representation of the body and information about the identified clothing items and sizes as inputs into a machine learning model;

detecting, by the machine learning model, patterns in the inputs to make predictions how a fabric elasticity and a garment construction could impact a fit of each identified clothing item relative to each of a plurality of body parts of the individual based on the 3D graphical representation of the body;

filtering, by the computing device, the clothing items by disqualifying one or more of said clothing items from further consideration based on results of said detecting and fit preferences of the individual;

generating recommended clothing items for the individual based on the filtering;

generating a fit score for each of the recommended clothing items based on a difference between the 3D body measurements and clothing specifications for each of the recommended clothing items;

using the fit scores to rank the recommended clothing item; and using a different one or more of the measurement techniques selected based on the first sensor data to either (a) modify the 3D graphical representation of the body for the individual, (b) create another 3D graphical representation of the body for the individual, or (c) create a 3D graphical representation of a body for another individual;

displaying the 3D graphical representation of the body for the individual, the another 3D graphical representation of the body for the individual, or the 3D graphical representation of the body for another individual.

2. The method according to claim 1, further comprising:
receiving a user selection of at least one recommended clothing item from the recommended clothing items; and causing a robotic system to modify a characteristic of the at least one recommended clothing item or deliver the at least one recommended clothing item to the individual.

3. The method according to claim 1, further comprising:
obtaining a virtual 3D clothing item for one of the clothing items which was identified based on results from comparing the 3D body measurements to reference measurements;

applying the virtual 3D clothing item to the avatar; and
evaluating how the virtual 3D clothing item fits a body of the avatar.

4. The method according to claim 3, further comprising:
adjusting a size of the virtual 3D clothing item; and
re-evaluating how the virtual 3D clothing item fits the body of the avatar.

5. The method according to claim 4, further comprising determining whether one or more of the virtual 3D clothing items could be altered to improve a fit on the body of the avatar.

6. The method according to claim 1, wherein the filtering comprises disqualifying at least one of the clothing items which was identified from being a recommended clothing item when the fit preferences of the individual would not be met if the at least one clothing item is worn by the individual.

7. The method according to claim 1, wherein further comprising performing operations by the computing device to determine whether any of the recommended clothing items could be altered to improve a fit on the body of the individual.

8. The method according to claim 1, wherein the 3D graphical representation of the body is created by combining first weighted values of a first selected one of the plurality of different body measurement techniques and second weighted values of a second selected one of the plurality of different body measurement techniques.

9. The method according to claim 1, further comprising causing, by the computing device, information associated with the recommended clothing items to be displayed on another computing device within a graphical user interface of a software application or within a web page of an ecommerce site.

10. The method according to claim 1, further comprising:
receiving a user input requesting alteration of a clothing item; and
autonomously causing automated tailoring equipment to obtain and alter the clothing item.

11. The method according to claim 10, further comprising causing an autonomous vehicle to obtain and deliver the clothing item which has been altered to the individual.

12. The method according to claim 1, further comprising identifying, by the computing device, at least one person of a plurality of persons for whom a ready-to-wear product would not fit in any available size based on body measurement information for the plurality of persons and reference measurement information associated with the ready-to-wear product.

13. The method according to claim 12, further comprising generating, by the computing device, a recommendation for an additional size for the ready-to-wear product based on the body measurement information for the plurality of persons.

14. The method according to claim 13, further comprising providing the recommendation for the additional size to a business entity providing the ready-to-wear product.

15. The method according to claim 1, further comprising comparing a clothing specification for a clothing item to 3D body measurements for a plurality of anonymized individuals to determine recommended changes to the clothing specification for improving a fit of the clothing item.

16. The method according to claim 15, further comprising providing the recommendation changes to the clothing specification to a business entity associated with the clothing item.

17. A system, comprising:
one or more first sensors configured to generate first sensor data comprising measured parameters of a surrounding environment;
a processor;
a non-transitory computer-readable storage medium comprising programming instructions that are configured to cause the processor to implement a method for automating clothing transactions, wherein the programming instructions comprise instructions to:
access a datastore to obtain stored condition information specifying a threshold range defining a specific condition when each of a plurality of different body measurement techniques should or should not be employed;
identify a parameter of the measured parameters that falls outside of the threshold range;
autonomously select one or more measurement techniques from a plurality of different body measurement techniques based on the identified parameter, the plurality of different body measurement techniques comprising two or more of a camera-based technique, a radar-based technique, a lidar-based technique, an optical-based technique, and a self-measurement-based technique;
use the selected one or more measurement techniques to create a 3D graphical representation of a body for an individual in a computing environment by:
obtaining at least one of user input data from the self-measurement-based technique and sensor data specifying characteristics of a body for an individual, the sensor data being generated using at least one of a camera, a radar system, a LiDAR system and an optical sensing system;

transforming the characteristics of the body of the individual into a 3D graphical representation of the body comprise a surface module or an avatar in the computing environment;

analyze the 3D graphical representation to derive 3D body measurements for the individual;

identify clothing items based on results from comparing the 3D body measurements to reference measurements associated with a plurality of clothing items having different styles, sizes and brand associations;

provide the 3D graphical representation of the body and information about the identified clothing items and sizes as inputs into a machine learning model;

detect, by a machine learning model, patterns in the inputs to make predictions how a fabric elasticity and a garment construction could impact a fit of each identified clothing item relative to each of a plurality of body parts of the individual based on the 3D graphical representation of the body;

filter the clothing items by disqualifying one or more of said clothing items from further consideration based on an output from the machine learning model and fit preferences of the individual;

generate recommended clothing items for the individual based on the filtered clothing items;

generate a fit score for each of the recommended clothing items based on a difference between the 3D body measurements and clothing specifications for each of the recommended clothing items;

use the fit scores to rank the recommended clothing item; and use a different one or more of the measurement techniques selected based on the first sensor data to either (a) modify the 3D graphical representation of the body for the individual, (b) create another 3D graphical representation of the body for the individual, or (c) create a 3D graphical representation of a body for another individual cause a display of the 3D graphical representation of the body for the individual, the another 3D graphical representation of the body for the individual, or the 3D graphical representation of the body for another individual.

18. The system according to claim 17, wherein the programming instructions further comprise instructions to:

receive a user selection of at least one recommended clothing item from the recommended clothing items; and cause a robotic system to modify a characteristic of the at least one recommended clothing item or deliver the at least one recommended clothing item to the individual.

19. The system according to claim 17, wherein the programming instructions comprise instructions to:

obtain a virtual 3D clothing item for one of the clothing items which was identified based on results from comparing the 3D body measurements to reference measurements;

apply the virtual 3D clothing item to the avatar; and evaluate how the virtual 3D clothing item fits a body of the avatar.

20. The system according to claim 19, wherein the programming instructions comprise instructions to:

adjust a size of the virtual 3D clothing item; and re-evaluate how the virtual 3D clothing item fits the body of the avatar.

21. The system according to claim 20, wherein the programming instructions comprise instructions to determine whether one or more of the virtual 3D clothing items could be altered to improve a fit on the body of the avatar.

22. The system according to claim 17, wherein the programming instructions comprise instructions to disqualify at least one of the clothing items which was identified from being a recommended clothing item when the fit preferences of the individual would not be met if the at least one clothing item is worn by the individual.

23. The system according to claim 17, wherein the programming instructions comprise instructions to determine whether any of the recommended clothing items could be altered to improve a fit on the body of the individual.

24. The system according to claim 17, wherein the 3D graphical representation of the body is created by combining first weighted values of a first selected one of the plurality of different body measurement techniques and second weighted values of a second selected one of the plurality of different body measurement techniques.

25. The system according to claim 17, wherein the programming instructions comprise instructions to cause information associated with the recommended clothing items to be displayed on another computing device within a graphical user interface of a software application or within a web page of an ecommerce site.

26. The system according to claim 17, wherein the programming instructions comprise instructions to:

receive a user input requesting alteration of a clothing item; and autonomously cause automated tailoring equipment to obtain and alter the clothing item.

27. The system according to claim 26, wherein the programming instructions comprise instructions to cause an autonomous vehicle to obtain and deliver the clothing item which has been altered to the individual.

28. The system according to claim 17, wherein the programming instructions comprise instructions to identify at least one person of a plurality of persons for whom a ready-to-wear product would not fit in any available size based on body measurement information for the plurality of persons and reference measurement information associated with the ready-to-wear product.

29. The system according to claim 28, wherein the programming instructions comprise instructions to generate a recommendation for an additional size for the ready-to-wear product based on the body measurement information for the plurality of persons.

30. The system according to claim 29, wherein the programming instructions comprise instructions to provide the recommendation for the additional size to a business entity providing the ready-to-wear product.

31. The system according to claim 17, wherein the programming instructions comprise instructions to compare a clothing specification for a clothing item to 3D body measurements for a plurality of anonymized individuals to determine recommended changes to the clothing specification for improving a fit of the clothing item.

32. The system according to claim 31, wherein the programming instructions comprise instructions to provide the recommendation changes to the clothing specification to a business entity associated with the clothing item.

33. The method according to claim 1, wherein the camera-based technique is selected based on the first sensor data indicating that an operating temperature of an internal component of the computing device falls outside a first threshold range and/or an external surface of the computing device falls outside a second threshold range.

34. The method according to claim 1, wherein one or both of the radar-based technique and the lidar-based technique is selected based on the first sensor data indicating a humidity of the surrounding environment exceeds a threshold humidity and/or an amount of ambient light is above a threshold level.

35. The method according to claim 8, wherein the self-measurement-based technique is weighted less than one or more of the camera-based technique, the radar-based technique, the lidar-based technique, and the optical-based technique.

36. The method according to claim 1, further comprising using the selected one or more measurement techniques to further create a body profile that defines one or more of a body type, a body shape and a body posture for the individual, and wherein the 3D body measurements for the individual are derived by analyzing the body profile in addition to the 3D graphical representation.

37. The method according to claim 1, wherein said analyzing the 3D graphical representation to derive 3D body measurements for the individual comprises:

comparing the 3D graphical representation to a plurality of pre-defined 3D models for human bodies; and selecting a 3D model from the plurality of pre-defined 3D models for human bodies based on the comparing.

38. The method according to claim 1, further comprising modifying the 3D body measurements for one or more body parts based on the user input data from the self-measurement-based technique.

* * * * *